(12) United States Patent
Uzawa et al.

(10) Patent No.: US 7,667,953 B2
(45) Date of Patent: Feb. 23, 2010

(54) ELECTROLYTIC CAPACITOR

(75) Inventors: Shigeru Uzawa, Nagano (JP); Akihiko Komatsu, Nagano (JP); Tetsushi Ogawara, Nagano (JP); Yoshishige Sakurai, Nagano (JP)

(73) Assignee: Rubycon Corporation, Nagano (JP)

( * ) Notice: Subject to any disclaimer, the term of this patent is extended or adjusted under 35 U.S.C. 154(b) by 146 days.

(21) Appl. No.: 10/580,333

(22) PCT Filed: Sep. 27, 2004

(86) PCT No.: PCT/JP2004/014535
§ 371 (c)(1),
(2), (4) Date: May 24, 2006

(87) PCT Pub. No.: WO2005/101433
PCT Pub. Date: Oct. 27, 2005

(65) Prior Publication Data
US 2007/0121276 A1    May 31, 2007

(30) Foreign Application Priority Data
Apr. 13, 2004   (JP) .............................. 2004-118009

(51) Int. Cl.
*H01G 9/02* (2006.01)
*H01M 6/04* (2006.01)
(52) U.S. Cl. ..................... 361/504; 252/62.2
(58) Field of Classification Search ......... 361/503–505; 252/62.2
See application file for complete search history.

(56) References Cited

U.S. PATENT DOCUMENTS

| 4,037,142 | A | * | 7/1977 | Poole | ........................ | 361/520 |
| 4,479,167 | A | * | 10/1984 | Ross et al. | ................... | 361/504 |
| 6,349,028 | B1 | * | 2/2002 | Komatsu | ..................... | 361/504 |
| 2005/0094352 | A1 | * | 5/2005 | Komatsu et al. | ............. | 361/504 |
| 2005/0225926 | A1 | | 10/2005 | Erhardt et al. | | |

FOREIGN PATENT DOCUMENTS

| DE | 20204027 U1 | | 7/2002 |
| EP | 569938 A1 | * | 11/1993 |
| EP | 1006536 A2 | | 6/2000 |
| EP | 1063662 A1 | | 12/2000 |
| JP | 62-18704 A | | 1/1987 |

(Continued)

OTHER PUBLICATIONS

International Search Report.

(Continued)

*Primary Examiner*—Eric Thomas
(74) *Attorney, Agent, or Firm*—Radar, Fishman & Grauer, PLLC

(57) ABSTRACT

An electrolytic solution, for use in an electrolytic capacitor, comprising a solvent and a solute wherein water accounts for 20 to 100% by weight of the solvent and the total solute content is from 1.5 to 44% by weight, and an electrolytic capacitor comprising a capacitor element, a case containing the capacitor element, and a sealant with which the case is sealed, the capacitor element comprising a pair of electrode foils each comprising a dielectric, a separator for isolating the electrode foils from each other, and the above electrolytic solution filled between the electrode foils.

22 Claims, 4 Drawing Sheets

FOREIGN PATENT DOCUMENTS

| | | | |
|---|---|---|---|
| JP | 01-235226 A | | 9/1989 |
| JP | 06-29155 A | | 2/1994 |
| JP | 2000-150322 A | | 5/2000 |
| JP | 2000150322 A | * | 5/2000 |
| JP | 2000-173876 A | | 6/2000 |
| JP | 2000173871 A | * | 6/2000 |
| JP | 2000-188240 A | | 7/2000 |
| JP | 2000-208376 A | | 7/2000 |
| JP | 2000-331886 A | | 11/2000 |
| JP | 2001-284181 A | | 10/2001 |
| JP | 2001-291643 A | | 10/2001 |
| JP | 2001-319833 A | | 11/2001 |
| JP | 2002-083743 A | | 3/2002 |
| JP | 2002-184655 A | | 6/2002 |
| JP | 2002-217067 A | | 8/2002 |
| JP | 2002-289482 A | | 10/2002 |
| JP | 2003-068581 A | | 3/2003 |
| JP | 2003-100558 A | | 4/2003 |
| JP | 2003-109855 A | | 4/2003 |
| JP | 2003197479 A | * | 7/2003 |
| JP | 2003-282367 A | | 10/2003 |
| JP | 2004-014666 A | | 1/2004 |
| JP | 2004-031983 A | | 1/2004 |
| WO | WO00/55876 A1 | | 9/2000 |

OTHER PUBLICATIONS

Chinese Office Action of Patent Application No. 200480035586.X dated Jul. 24, 2009.

Office Action of Japanese Patent Application No. 2004-118009 mailed on Oct. 20, 2009 (Japan).

Office Action of European Patent Application No. 04773564.2 mailed on Sep. 29, 2009 (EPO).

\* cited by examiner

ELECTROLYTIC CAPACITOR

TECHNICAL FIELD

The present invention relates to an electrolytic solution for an electrolytic capacitor, and to an electrolytic capacitor using the same. More particularly, the present invention relates to an electrolytic solution, for use in an electrolytic capacitor, which has very low equivalent series resistance and shows an excellent temperature stability that has never been attained, and also shows excellent electrical characteristics under low temperature conditions and stable electrical characteristics at a temperature just above the freezing temperature, and to a high-performance electrolytic capacitor using the same. The electrolytic solution of the present invention is useful in an aluminum electrolytic capacitor and in other electrolytic capacitors.

BACKGROUND ART

Generally, a capacitor is a general electric part and has widely been used in power circuits and noise filters for digital circuits in various electric and electronic devices. Various electrolytic capacitors have been used and examples include an aluminum electrolytic capacitor, a wet tantalum electrolytic capacitor and the like. An aluminum electrolytic capacitor is expected to provide a particularly excellent function using the present invention. Therefore, the present invention will now be described with reference to this kind of electrolytic capacitor.

A conventional aluminum electrolytic capacitor can be produced by using an anode foil which is made by etching a high-purity aluminum foil, to increase its surface area, and anodizing the surface of the aluminum foil to provide a film, and a cathode foil whose surface has only been etched. The resulting anode foil and cathode foil are disposed opposite to each other and an element with a wound structure is made by interposing a separator (release paper) between the foils, followed by winding, and then an element made by winding the element with a wound structure is impregnated with an electrolyte solution. The element impregnated with the electrolyte solution is contained in a case (generally made of aluminum), which is then sealed with an elastic sealant, thus completing an electrolytic capacitor. An electrolytic capacitor may have a structure other than a wound structure.

In the above-described electrolytic capacitor, the characteristics of the electrolyte solution may be factors which decides the performances of the electrolytic capacitor. A conventional electrolyte solution for use in an electrolytic capacitor is generally prepared by dissolving, as an electrolyte, a carboxylic acid such as adipic acid, benzoic acid, etc. or an ammonium salt thereof into a solvent prepared by adding about 30% by weight or less of water to ethylene glycol (EG) as a principal solvent. Such an electrolyte solution has a specific resistance of about 1.0 $\Omega \cdot m$ (100 $\Omega \cdot cm$). Such a specific resistance is insufficient for recent small, high-performance electrolytic capacitors. Thus, a highly conductive electrolytic capacitor having a low specific resistance is required.

Intensive studies have been made in this field to improve the characteristics of the electrolytic solution, and various electrolytic solutions for use in an electrolytic capacitor have already been proposed. Referring to the patent documents which have recently been laid open to public inspection, there have been proposed the following aluminum electrolytic solutions for use in an electrolytic capacitor.

An aluminum electrolytic solution for use in an electrolytic capacitor, which contains 20 to 90% by weight of water, comprising at least one ammonium salt compound selected from the group consisting of ammonium salt compounds such as ammonium formate, as a principal electrolyte, and 1% by weight or more of at least one carboxylic acid compound selected from the group consisting of carboxylic acid compounds such as trimethyladipic acid which has no fire point, wherein a solidification point is −10° C. or lower (see, Japanese Unexamined Patent Publication (Kokai) No. 2000-188240).

An aluminum electrolytic solution for use in an electrolytic capacitor, comprising a solvent containing 35 to 100% by weight of water and a chelating agent (see, Japanese Unexamined Patent Publication (Kokai) No. 2000-331886).

An aluminum electrolytic solution for use in an electrolytic capacitor, comprising a solvent containing 35 to 100% by weight of water and a bonded product formed by bonding phosphoric acid ions to a water-soluble complex comprising aminopolycarboxylic acid and ammonium (see, Japanese Unexamined Patent Publication (Kokai) No. 2001-319833).

Aluminum electrolytic solution for use in an electrolytic capacitor, comprising a solvent containing 35 to 100% by weight of water, at least one of adipic acid and a salt thereof dissolved in the solvent, and a bonded product formed by bonding phosphoric acid ions to a water-soluble complex comprising tannin and/or a decomposition product of tannin and aluminum (see, Japanese Unexamined Patent Publication (Kokai) No. 2002-83743).

An aluminum electrolytic solution for use in an electrolytic capacitor, comprising a solvent containing 35 to 100% by weight of water and a water-soluble aluminum complex bonded with phosphoric acid ions (see, International Publication No. WO00/55876).

It can be seen that these electrolytic solutions for use in an electrolytic capacitor and other electrolytic solutions have improved working life or durability at high temperature and other characteristics. However, some room for improvement is left. For example, a conventional electrolytic solution is inferior in noise removing ability and in charging/discharging efficiency because the equivalent series resistance (ESR) of a capacitor cannot be decreased sufficiently. Therefore, the resulting electrolytic capacitor cannot be used advantageously as an electronic part. Also an electrolytic capacitor using a conventional electrolytic solution has a problem that the electrical characteristics are unstable over a wide temperature range from a low temperature just above the freezing temperature to a high temperature and also the ESR drastically varies. Furthermore, a conventional electrolytic capacitor has a problem that swelling and liquid leakage from the case containing the capacitor element sometimes occurs and the working life at a high temperature is short.

DISCLOSURE OF THE INVENTION

An object of the present invention is to solve the above problems of the prior art and to thereby decrease equivalent series resistance (ESR) of the capacitor, and thus provide an electrolytic solution for use in an electrolytic capacitor which is excellent in noise removing ability and charging and discharging efficiency and is also capable of realizing an electrolytic capacitor having the ideal characteristics for electronic parts.

More particularly, a first object of the present invention is to provide an electrolytic solution, for use in an electrolytic capacitor, capable of realizing an electrolytic capacitor which shows excellent and stable electrical characteristics in a wide temperature range from a low temperature just above the freezing temperature to high temperature and also causes little change in ESR.

A second object of the present invention is to provide a flame-retardant, safe and cheap electrolytic solution for use in an electrolytic capacitor by suppressing the use of an expensive organic solvent as much as possible.

A third object of the present invention is to provide an electrolytic solution, for use in an electrolytic capacitor, capable of realizing a long working life by controlling the total content of an electrolyte thereby to suppress a vigorous reaction with an electrode foil.

A fourth object of the present invention is to provide an electrolytic capacitor which shows low ESR and also shows excellent and stable electrical characteristics in a wide temperature range from a low temperature just above the freezing temperature to high temperature.

A fifth object of the present invention is to provide an electrolytic capacitor which causes neither swelling nor liquid leakage from the case containing a capacitor element and is excellent in airtightness and sealing strength, and is also excellent in working life at a high temperature.

These objects as well as other objects of the present invention will easily become apparent from the following detailed description.

In one aspect thereof, the present invention resides in an electrolytic solution, for use in an electrolytic capacitor and comprising a solvent and a solute, wherein water accounts for 20 to 100% by weight of the solvent and the total solute content is from 1.5 to 44% by weight.

In another aspect thereof, the present invention resides in an electrolytic capacitor comprising a capacitor element, a case containing the capacitor element, and a sealer with which the case is sealed, the capacitor element including a pair of electrode foils each comprising a dielectric, a separator for isolating the electrode foils from each other, and an electrolytic solution filled between the electrode foils, wherein the electrolytic solution is an electrolytic solution for use in an electrolytic capacitor according to the present invention.

BEST MODE FOR CARRYING OUT THE INVENTION

Figure 1:
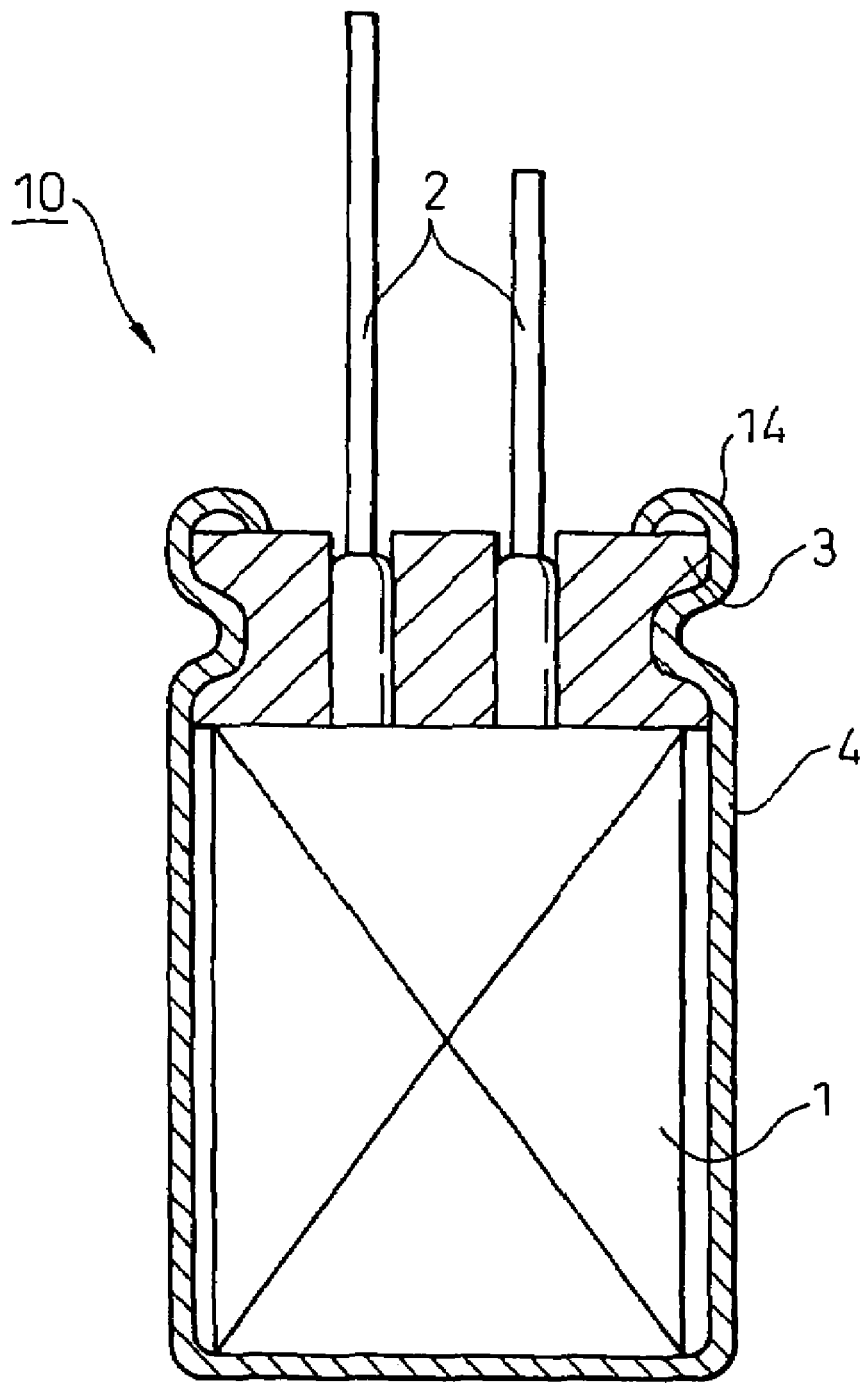
FIG. 1 is a sectional view showing an example of an electrolytic capacitor according to the present invention.

Subsequently, the present invention will now be described by way of the preferred embodiments thereof. It should be understood that the present invention is not limited to these embodiments.

In one aspect thereof, the present invention resides in an electrolytic solution for use in an electrolytic capacitor comprising at least a solvent, water accounting for 20 to 100% by weight of the solvent, and a solute which is generally referred to as an electrolyte.

In the electrolytic solution of the present invention, the total content of the electrolyte as the solute is within a range from 1.5 to 44% by weight. As a result of a study using various amounts of the solute, it has been found that characteristics stable at high temperature can be maintained by controlling the total solute content (the total content of the solute) within a range from 1.5 to 44% by weight thereby to suppress a vigorous reaction with an electrode foil. The total solute content is optionally decided according to a specific resistance required with respect to each electrolytic solution, but is preferably from 1.5 to 35% by weight, more preferably from 1.5 to 30% by weight, still more preferably from 1.5 to 25% by weight, still more preferably from 1.5 to 20% by weight, still more preferably from 1.5 to 15% by weight, still more preferably from 1.5 to 10% by weight, and most preferably from 1.5 to 5% by weight. It has also been found that the total solute content is most preferably from 23.5 to 44% by weight, or from 27 to 44% by weight.

When an electrolytic solution having large specific resistance such as 65 Ω·cm (for example, the total solute content of 1.5 to 5% by weight) is used, the desired characteristics and features can be maintained by controlling the content of water in the solvent to within a range from more than 75% by weight to 100% by weight.

When the content is within the above range, little change in ESR at low temperature was seen compared with the case of a conventional electrolytic solution. When the content of the solute exceeds 44% by weight, high conductivity and excellent characteristics at low temperature are attained. However, it becomes difficult to attain long working life at a high temperature. Also the solute becomes insoluble in the solution to form crystals and, therefore, it is not preferable in view of operability.

When the content of the solute is within a range from 23.5 to 44% by weight, even if a solvent having water content within a range from 20 to 100% by weight is used, high conductivity and little change in ESR at low temperature were attained and thus a long working life could be attained at a high temperature. Particularly, when the content of water in the solvent is within a range from more than 75% by weight to 100% by weight, the maximum effect was exerted.

In the electrolytic solution of the present invention, the solvent capable of dissolving the solute is (1) a solvent alone consisting only of water, or (2) a solvent in which the content of water in the solvent is from 20 to 100% by weight, that is, a mixture of water and a solvent other than water, which is a solvent mixture having a high water content. Examples of the solvent other than water include organic solvent and inorganic solvent. As described in detail below, the present invention can unexpectedly provide an electrolytic capacitor with excellent and stable capacitor characteristics even if the water content is very high.

In the practice of the present invention, a polar solvent can be preferably used as the organic solvent. For example, the polar solvent is a protonic solvent, an aprotic solvent or the other polar solvent, and these polar solvents can be used alone or in combination. For example, one or more protonic solvents and one or more aprotic solvents can be used in combination.

The protonic solvent is preferably an alcohol compound. Specific examples of the alcohol compound which can be advantageously used herein include, but are not limited to:

monohydric alcohols such as methyl alcohol, ethyl alcohol, propyl alcohol, and butyl alcohol, dihydric alcohols (glycols) such as ethylene glycol, diethylene glycol, triethylene glycol, and propylene glycol, and trihydric alcohols such as glycerin.

Examples of preferred aprotic solvent include, but are not limited to, lactone compounds such as γ-butyrolactone, propylene carbonate (PC), sulfolane, tetrahydrofuran, and acetonitrile.

Examples of the other polar solvent include intramolecular polarized compounds such as dimethylformamide and nitrobenzene.

In the practice of the present invention, the above-described polar solvent or other polar solvents can be optionally used. When using at least one selected from the protonic and aprotic solvents, more specifically, one protonic solvent may be used, one aprotic solvent may be used, plural protonic solvents may be used, plural aprotic solvents may be used, alternatively a mixed solvent of at least one protonic solvent and at least one aprotic solvent may be used.

In the electrolyte solution of the present invention, water is used alone, or a mixture of water and a solvent other than water, particularly an organic solvent can be used. Particularly, the present invention differs from a conventional electrolyte solution in that a comparatively large amount of water is preferably used without causing any problem. According to the present invention, by using such a solvent comprising water and an organic solvent, the solidifying point of the solvent is lowered, thereby making it possible to improve the specific resistance characteristics, at low temperature, of the electrolyte solution and to realize good low-temperature stability expressed by a small difference between resistivity at low temperature and that at normal temperature.

More specifically, when ethylene glycol (EG) is used as the organic solvent, this protonic solvent has a boiling point of about 198° C. and a melting point of about −13° C. As the temperature applied to the capacitor is generally within a range from −40° C. to 85–105° C., the electrolytic solution using this solvent has satisfactory characteristics at high temperatures. However, electrical characteristics drastically deteriorate at low temperature due to an increase in viscosity and the solidification of the electrolytic solution. In the present invention, by using a solvent comprising water and an organic solvent, which is prepared by adding a large amount of water to an organic solvent having excellent temperature stability and a comparatively high ossification point, the ossification point of the solvent is lowered, thereby making it possible to secure good electrical characteristics at a low temperature. Since this water-organic solvent-based electrolytic solution is excellent in solubility of the electrolyte as the solute and ionic mobility, there can be realized specific resistance which is far lower than that of a conventional electrolytic solution. As characteristics of the solvent are improved at low temperature, there can be obtained an electrolytic solution having characteristics which have never before been attained, that is, it shows small difference between a specific resistance at low temperature and that at normal temperature. Therefore, an electrolytic capacitor using such an electrolytic solution can have good temperature stability, due to the electrolytic solution, as a matter of course.

In the electrolytic solution of the present invention, the content of water in the solvent is preferably within a range from more than 75% by weight to 100% by weight. In a conventional electrolytic solution, when the content of water is 90% by weight or more, the temperature stability of water is greatly affected and the specific resistance drastically increases due to ossification at low temperature, while the electrolytic solution can scatter due to high vapor pressure at high temperature. In the electrolytic solution of the present invention, these problems do not arise. An aqueous highly conductive (low-specific resistance) solution is frozen at low temperature when the content of water increases to about 100%. When the electrolytic solution of the present invention is used in an electrolytic capacitor, it is stable at a freezing temperature of about −25° C. and shows excellent electrical characteristics and, also, its equivalent series resistance (ESR) scarcely varies. According to the present invention, there can be provided an electrolytic capacitor, which is excellent in temperature stability and shows a low ESR, in a wide temperature range from low temperature of about a freezing temperature (about −25° C.) to high temperature. According to the present inventors' study, such a noticeable effect is obtained because an electrolytic solution having a very high water content has a very low viscosity and this low viscosity is involved in electric conductivity. Actually, the electrolytic solution of water/EG in a mixing ratio of 80/20 has a viscosity of 2.8 cP (at 25° C.), whereas, the electrolytic solution of 100% water has a low viscosity such as 1.8 cP (at 25° C.). In the electrolytic solution of the present invention, the water content is preferably from 80 to 100% by weight, and most preferably from 90 to 100% by weight.

The electrolytic solution of the present invention may contain an organic solvent and an inorganic solvent as the solvent. It may be a combination of an organic solvent and water, or a combination of water and another solvent. The same effect as that in case of using a water-organic solvent or water alone can be obtained by containing such a solvent.

The electrolytic solution of the present invention has a specific resistance of about 65 Ω·cm or less as measured at 30° C. When an electrolytic capacitor, for example, an aluminum electrolytic capacitor is produced by using such an electrolytic solution having a low specific resistance, the electrolytic capacitor can unexpectedly realize a very low equivalent series resistance (ESR). The electrolytic capacitor having low ESR can realize ideal characteristics for electronic parts because it is excellent in noise removing ability and efficiency in charging/discharging. The specific resistance (at 30° C.) of the electrolytic solution is preferably about 45 Ω·cm or less, more preferably 30 Ω·cm or less, still more preferably about 15 Ω·cm or less, and most preferably 10 Ω·cm or less.

As the electrolyte in the electrolyte solution of the present invention, an organic acid, particularly preferably a carboxylic acid or a salt or derivative thereof, and an inorganic acid or a salt thereof may be used. These electrolyte components may be used alone, or two or more kinds of them may be used in combination.

Examples of the carboxylic acid which can be used as the electrolyte component include, but are not limited, to monocarboxylic acid such as formic acid, acetic acid, propionic acid, butyric acid, and benzoic acid; dicarboxylic acids such as oxalic acid, malonic acid, fumaric acid, maleic acid, succinic acid, glutaric acid, adipic acid, phthalic acid, azelaic acid, and sebacic acid; hydroxylcarboxylic acids such as citric acid, salicylic acid, borodisalicylic acid, hydroxybutyric acid, and hydroxybenzoic acid; and nitro group-containing carboxylic acids such as nitrobenzoic acid and dinitrobenzoic acid. These carboxylic acids may be used as they are, or may be used in the form of salts of the carboxylic acid. Examples of preferred salt include, but are not limited to, ammonium salt, sodium salt, potassium salt, amine salt, and alkylammonium salt. Among these salts, an ammonium salt is more preferably used. If necessary, derivatives of the above-described carboxylic acids may be used.

The above-described carboxylic acids or salts or derivatives thereof (hereinafter referred to as "carboxylic acid") may be used alone as the electrolyte, or two or more kinds of carboxylic acids may be optionally used in combination, including inorganic acids described hereinafter. The most preferred amount of these electroloytes used in the electrolytic solution of the present invention can be appropriately decided depending on various factors such as characteristics required to the electrolyte solution and the capacitor obtained finally, kind, compositions and amount of the solvent, and kind of the electrolyte. The content of these carboxylic acid-based electrolytes is preferably within a range from about 0.5 to 44%, more preferably from about 0.5 to 35% by weight, and most preferably from about 0.5 to 5% by weight, based on the total amount of the electrolytic solution. Also it has been found that the content is most preferably within a range from about 23.5 to 44% by weight.

Examples of the inorganic acid which can be used as the electrolyte component include, but are not limited to, carbonic acid, phosphoric acid, phosphorous acid, hypophosphorous acid, boric acid, and sulfamic acid. These inorganic acids may be used as they are, or may be used in the form of salts of the inorganic acid. Examples of preferred salt include, but are not limited to, ammonium salt, sodium salt, potassium salt, amine salt, and alkylammonium salt. Among these salts, an ammonium salt is more preferably used. If necessary, derivatives of the above-described inorganic acids may be used.

The above-described inorganic acids or salts or derivatives thereof (hereinafter referred to as "inorganic acid") may be used alone as the electrolyte, or two or more kinds of inorganic acids may be optionally used in combination, including carboxylic acids described hereinafter. Most preferred amount of these electroloytes used in the electrolytic solution of the present invention can be appropriately decided depending on various factors such as characteristics required to the electrolyte solution and the capacitor obtained finally, kind, compositions and amount of the solvent, and kind of the electrolyte. The content of these inorganic acid-based electrolytes is preferably within a range from about 1 to 20%, more preferably from about 1 to 15% by weight, and most preferably from about 1 to 10% by weight, based on the total amount of the electrolytic solution. Also it has been found that the content of these inorganic acid-based electrolytes is most preferably within a range from about 1 to 5% by weight.

When using the inorganic acid as the electrolyte in the practice of the present invention, lowering of the freezing point of the electrolyte solution can be expected, thereby making it possible to contribute to a further improvement in characteristics at a low temperature of the electrolyte solution. The use of the inorganic acid is noticeable in that the hydrogen gas absorbability derived from the nitro compound used particularly in the present invention can be maintained for a long period of time.

According to the present inventors' study, by using an electrolyte such as inorganic acid in combination with the above-described carboxylic acid, the effect capable of remarkably prolonging working life of the electrolytic capacitor as compared with the case where they are used alone. Furthermore, an inorganic acid-based electrolyte has hitherto been used exclusively in a middle- or high-voltage (160 to 500 volt) type electrolytic capacitor in a conventional electrolytic capacitor in view of the conductivity. However, when using electrolytes in combination, as in the present invention, the electrolyte can also be used advantageously in a low-voltage (lower than 160 volt) type electrolytic capacitor.

In case of using an organic acid in combination with an inorganic acid, it is possible to use any of a high-conductive carboxylic acid or a salt thereof, an inorganic acid or a salt thereof, an organic acid having high aluminum oxide film ($Al_2O_3$) forming and protecting ability or a salt thereof, an inorganic acid or a salt thereof in combination. This is effective to stabilize capacitor capacity and to reduce ESR and leakage current and is also effective to improve working life at high temperature.

Examples of the high-conductive electrolyte include formic acid, sulfamic acid, glutaric acid, tartaric acid, maleic acid, and succinic acid; examples of the electrolyte having high aluminum oxide film forming and restoring ability include adipic acid, benzoic acid, boric acid, phosphoric acid, hypophosphorous acid, and phosphorous acid; and examples of the electrolyte having high aluminum oxide film protecting ability include citric acid, gluconic acid, and ethylenediaminetetraacetic acid.

The electrolytic solution of the present invention can optionally contain various additives, in addition to the above-described solvents and electrolytes. Examples of preferred additives include, but are not limited, to the followings:

(1) a nitro compound, a nitroso compound or a salt or derivative thereof, (2) a chelete forming compound or a salt or derivative thereof, (3) saccharides, (4) a phosphorus compound or a derivative thereof, (5) a silane coupling agent, and (6) a water-soluble polymer. These additives may be used alone, or two or more kinds of these additives may be appropriately used in combination.

Each of these additives will be described hereinafter.

Nitro Compound, Nitroso Compound or Salts or Derivatives Thereof:

If necessary, the electrolytic solution of the present invention can contain nitro or nitroso compounds alone or in combination. If necessary, these compounds may be used in the form of salts or derivatives thereof. The group of these compounds is particularly referred to as a "nitro compound" in the present invention.

Examples of the nitro compound suited for the practice of the present invention include, but are not limited to, aromatic and aliphatic nitro compounds. Specific examples thereof include organic compounds having a nitro group, for example, nitrophenols such as p-nitrophenol and dinitrophenol; nitrobenzoic acids such as p-nitrobenzoic acid, dinitrobenzoic acid, trinitrobenzoic acid, and nitroanisole; and nitroacetophenone such as p-nitroacetophenone, aminonitrobenzoic acid, nitrosalicylic acid, and nitroguanidine.

Examples of the nitroso compound suited for the practice of the present invention include, but are not limited to, aromatic and aliphatic nitroso compounds. Specific examples thereof include organic compounds having a nitro group, such as nitrosobenzoic acid, nitrosonaphthol, nitrosophenol, and cupferron.

Furthermore, the above-described nitro and nitroso compounds may be used in the form of salts or derivatives thereof. Examples of preferred salts thereof include, but are not limited to, ammonium, sodium, potassium, amine and alkylammonium salts.

In the present invention, when the above-described nitroso and nitroso compounds are used in the electrolytic solution, a particularly remarkable hydrogen gas absorption function could be obtained by the reduction reaction of substituents of these compounds. It is understood, based on the present inventors' experience, that a large factor lies in that substituents contained in each nitro compound exhibit the hydrogen gas absorption function at different timings due to the reduction reaction of a nitro group. The nitro compound used herein can also have a function of inhibiting corrosion of the element caused by a function of a carbon halogenide such as trichloroethane used on washing of a printed board, (halogen scavenging function in other words).

When the nitro compound is added to the electrolyte solution of the present invention, the nitro compound can exhibit satisfactory hydrogen absorption function and halogen scavenging function even when used alone because specific compositions effective to the function of the present invention are employed in the electrolyte solution itself. A more preferred function can be expected by using two or more nitro compounds in combination. It is generally recommended to use two nitro compounds in combination in the present invention.

The nitro compound is preferably added in the amount within a range from about 0.05 to 10% by weight based on the total amount of the electrolyte solution. When the amount of the nitro compound is smaller than 0.05% by weight, an expected function is hardly obtained. On the other hand, even when the amount exceeds 10% by weight, a further improvement in function cannot be expected and a deleterious influence is sometimes exerted on the other characteristics. The amount of the nitro compound is more preferably within a range from about 0.05 to 5% by weight, and most preferably from about 0.1 to 5% by weight, based on the total amount of the electrolyte solution.

The use of the nitro compound will be described in more detail below. The absorption function of the hydrogen gas evolved on the reaction between aluminum used as the electrode foil and water is liable to be lowered with the increase in amount of water in the solvent when using the nitro compound alone. This lowering tendency becomes drastic in case where the electrolyte solution is subjected to high temperature conditions. However, problems caused by using these nitro compounds alone can be solved by using two or more nitro compounds in combination, as in the present invention. Actually, in case of the electrolyte solution of the present invention, the hydrogen gas absorbability can be maintained under high temperature conditions for a longer period of time than the case where these nitro compounds are used alone by using plural nitro compounds.

An excellent function in absorption of the hydrogen gas according to the present invention could also be confirmed in a relation with the electrolyte used in combination. In a conventional electrolyte solution, the procedure of adding only one nitro compound to only a carboxylic acid-based electrolyte, or adding only one nitro compound to only an inorganic acid-based electrolyte has been employed. However, satisfactory hydrogen gas absorption function cannot obtained by the procedure in case where the amount of water contained in the solvent is large, and the same results are obtained in an electrolyte solution wherein both of a carboxylic acid-based electrolyte and an inorganic acid-based electrolyte are present. In case of the electrolyte solution of the present invention (using only one nitro compound), the hydrogen gas absorbability could be maintained for a longer period of time than the case where nitro compounds are used alone, surprisingly, even in case of the carboxylic acid/inorganic acid mixed electrolyte solution.

Chelete Forming Compound or Salts or Derivatives Thereof:

If necessary, the electrolytic solution of the present invention can optionally contain chelete forming compounds, that is, compounds capable of forming a chelete compound, in other words, chelete reagents or chelete forming compounds, or salts or derivatives thereof alone or in combination. The group of these chelete forming compound is particularly referred to as a "chelete forming compound" in the present invention.

Examples of the chelete forming compound suited for the practice of the present invention include, but are not limited to, ethylenediaminetetraacetic acid (EDTA), trans-1,2-diaminocyclohexane-N,N,N',N'-tetraacetic acid monohydrate (Cy-DTA), dihydroxyethylglycine (DHEG), ethylenediaminetetrakis(methylenephosphonic acid) (EDTPO), diethylenetriamine-N,N,N',N'',N''-pentaacetic acid (DTPA), citric acid, diaminopropanoltetraacetic acid (DPTA-OH), ethylenediaminediacetic acid (EDDA), ethylenediamine-N,N'-bis(methylenephosphonic acid)½hydrate(EDDPO), 2-aminoethyl ethyleneglycol tetraacetic acid (GEDTA), and hydroxyethylethylenediaminetriacetic acid (EDTA-OH). The chelete forming compound used in the present invention includes optional compounds having the coordination capable of forming a chelete in the molecule, or derivatives thereof.

The above-described chelete forming compounds can be added to the electrolytic solution in various amounts, but is preferably added in the amount within a range from about 0.01 to 5% by weight. The chelete forming compound can exert effects such as prolongation of working life due to inhibition of the hydration reaction of an aluminum (Al) electrode foil of a low-impedance capacitor, improvement in a stability at low temperature of an electrolytic capacitor (a change between an impedance at normal temperature and that at low temperature decreases because the solvent has compositions close to those corresponding to a non-frozen state), and improvement in corrosion resistance. The amount of the chelete forming compound is more preferably within a range from about 0.05 to 5% by weight, and most preferably from about 0.1 to 5% by weight, based on the total amount of the electrolyte solution.

Saccharides:

If necessary, the electrolytic solution of the present invention can optionally contain saccharides alone or in combination. Examples of the saccharides suited for the practice of the present invention include monosaccharides, disaccharides, trisaccharides, polysaccharides, and derivatives thereof. Specific examples of the monosaccharides include, but are not limited to, pentose, hexose, triose, tetrose, heptose, and derivatives thereof. Specific examples of the pentose or hexose include, but are not limited to, mannitol, glucose, xylitol, fructose, xylose, galactose, ribose, mannose, arabinose, lyxose, allose, altose, gulose, idose, talose, and derivatives thereof.

Specific examples of the disaccharides include, but are not limited to, maltose, sucrose, lactose, cellobiose, saccharose, agarobiose, and derivatives thereof.

Specific examples of the trisaccharides include, but are not limited to, maltotriose and derivative thereof.

Specific examples of the polysaccharides include, but are not limited to, starch, glycogen, agar, mannan, and derivatives thereof.

These saccharides can exert effects such as prolongation of working life due to inhibition of the hydration reaction of an aluminum electrode foil of a low-impedance capacitor, inhibition of decomposition or activation of an electrolyte (e.g. carboxylic acid) due to the addition of saccharides, and improvement in a stability at low temperature of an electrolytic capacitor (a change between an impedance at normal temperature and that at low temperature decreases because the solvent has compositions close to those corresponding to a non-frozen state).

The above-described saccharides are added to the electrolytic solution in various amounts, but are preferably added in the amount within a range from about 0.01 to 10% by weight based on the total amount of the electrolytic solution. The amount of the saccharides is more preferably within a range from about 0.05 to 10% by weight, and most preferably from about 0.05 to 5% by weight, based on the total amount of the electrolytic solution.

Phosphorus Compound or Derivatives Thereof:

If necessary, the electrolytic solution of the present invention can optionally contain phosphorus compounds or derivatives thereof alone or in combination. Examples of the phosphorus compound suited for the practice of the present invention include inorganic and organic phosphoric acid compounds and derivative thereof. Specific examples thereof include, but are not limited to, organic phosphoric acid compounds and organic phosphoric acid ester compounds such as urea phosphate, trimethyl phosphite, diethyl phosphite, triethyl phosphate, and tributyl phosphate, and derivatives of these compounds. Among these, organic phosphoric acid ester compounds and derivatives thereof are particularly preferable. These phosphorus compounds can exhibit the same function as that of the above-described chelete forming compounds.

The above-described phosphorus compounds are added to the electrolytic solution in various amounts, but are preferably added in the amount within a range from about 0.01 to 5% by weight based on the total amount of the electrolytic solution. The amount of the phosphorus compound is more preferably within a range from about 0.05 to 5% by weight, and most preferably from about 0.1 to 5% by weight, based on the total amount of the electrolytic solution.

Silane Coupling Agent:

If necessary, the electrolytic solution of the present invention can optionally contain silane coupling agents alone or in combination. Examples of the silane coupling agent suited for the practice of the present invention include, but are not limited to, vinyltris(2-methoxyethoxy)silane (KBC-1003 manufactured by Shin-Etsu Chemical Co., Ltd), vinyltriethoxysilane (KBE-1003), vinyltrimethoxysilane (KBM-1003 manufactured by Shin-Etsu Chemical Co., Ltd), 3-methacryloxypropyltrimethoxysilane (KBM-503 manufactured by Shin-Etsu Chemical Co., Ltd), 2-(3,4-epoxycyclohexyl)ethyltrimethoxysilane (KBM-303 manufactured by Shin-Etsu Chemical Co., Ltd), 3-glycidoxypropyltrimethoxysilane (KBM-403 manufactured by Shin-Etsu Chemical Co., Ltd), 3-glycidoxypropylmethyldiethoxysilane (KBE-402 manufactured by Shin-Etsu Chemical Co., Ltd), N-2 (aminoethyl)3-aminopropyltrimethoxysilane (KBM-603 manufactured by Shin-Etsu Chemical Co., Ltd), N-2(aminoethyl)3-aminopropylmethyldimethoxysilane (KBM-602 manufactured by Shin-Etsu Chemical Co., Ltd), 3-aminopropyltriethoxysilane (KBE-903 manufactured by Shin-Etsu Chemical Co., Ltd), N-phenyl-3-aminopropyltrimethoxysilane (KBM-573 manufactured by Shin-Etsu Chemical Co., Ltd), and 3-mercaptopropyltrimethoxysilane (KBM-803 manufactured by Shin-Etsu Chemical Co., Ltd). Taking account of solubility in the electrolytic solution and storage stability of the coupling agent itself, 3-glycidoxypropyltrimethoxysilane and N-2(aminoethyl)3-aminopropyltrimethoxysilane are particularly preferable.

By the way, the silane coupling agent is generally represented by R—Si(OR')$_3$ and is hydrolyzed and converted into R—Si(OH)$_3$ when dissolved in water. On the surface of the electrode foil, a natural oxide film is formed even in case of a cathode foil which is not anodized, and an aluminum oxide is represented by Al$_2$O$_3$.nH$_2$O. When the electrode foil is contacted with a silane coupling agent, —OH of the coupling agent reacts with —OH of the aluminum oxide and aluminum and the aluminum oxide is dehydrated, and thus a thin film is formed on the surface of the foil. It is considered that this silicon compound film suppresses the hydration reaction of the surface of the foil.

The above-described silane coupling agents are added to the electrolytic solution in various amounts, but are preferably added in the amount within a range from about 0.1 to 5% by weight based on the total amount of the electrolytic solution. The amount of the silane coupling agent is more preferably within a range from about 0.5 to 5% by weight based on the total amount of the electrolytic solution.

Water-soluble Polymer:

If necessary, the electrolytic solution of the present invention can optionally contain water-soluble polymers alone or in combination. The water-soluble polymer may be either of a synthetic polymer compound and a natural polymer compound. Examples of the synthetic polymer compound suited for the practice of the present invention include, but are not limited to, polyacrylic acid, polymethacrylic acid, polyacrylamide, polyvinyl alcohol and polyethylene oxide, and salts and esters thereof, and other derivatives. The natural polymer compound is preferably polyalginic acid or poly γ-glutamic acid.

In the practice of the present invention, polyacrylamide or a derivative thereof can be advantageously used as the water-soluble polymer. The polyacrylamide used herein or derivative thereof can be represented by the following general formula.

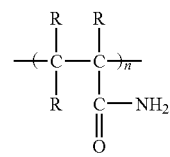

In the above formula, R may be the same or different and represent a hydrogen atom, or a substituted or non-substituted lower alkyl group having 1 to 4 carbon atoms, such as methyl or ethyl group, and n represents a positive integer and is preferably an integer required to give a molecular weight of about 100 to 2,000,000. All Rs in the formula are preferably hydrogen atoms.

The polyacrylamide or derivative thereof is a polymer compound which is easily soluble in water, but is slightly soluble in an organic solvent. When this polyacrylamide or derivative thereof is added to an electrolytic solution comprising water or a water-organic acid-based solvent according to the present invention, unexpectedly, excellent frequency characteristics are maintained even under low temperature conditions and the electrolytic solution is stable even under high temperature conditions and, furthermore, the reaction with the electrode metal is suppressed for a long time, and thus characteristics cause less change with time and a long work life is attained. Actually, the working life of the electrolytic capacitor using an electrolytic solution containing no polyacrylamide is within a range from 1,000 to 2,000 hours (at 105° C.) at most, whereas, the working life of the electrolytic capacitor using an electrolytic solution containing polyacrylamide or a derivative thereof can be prolonged to 3,000 hours or more. The electrolytic solution containing polyacrylamide or a derivative thereof exhibits capacitor characteristics which are remarkably stable from low temperature to high temperature, and can sufficiently satisfy temperature acceleration conditions: 2-fold/10° C. in the Arrhenius's chemical reaction.

It is considered that the above-described remarkable effect largely depends on the fact that polyacrylamide or derivative thereof has the function of uniformly dispersing ions in the electrolytic solution. This function can inhibit concentration of ions in the electrolytic solution caused when the reaction enhances, and thus it is possible to suppress activity and deterioration of the electrolytic solution for a long time even under high temperature conditions. Under low temperature conditions, conductivity can be maintained by decreasing the solidification temperature of the solution.

Polyacrylamide or derivatives thereof or other water-soluble polymers, each having different molecular weight, can be used. The molecular weight of the water-soluble polymer suited for working of the present invention is usually within a range from about 100 to 2,000,000, and preferably from about 100 to 1,000,000. In the practice of the present invention, various water-soluble polymers including polyacrylamide or derivatives thereof, having a molecular weight from comparatively low molecular weight (oligomer) to high molecular weight, can be used according to the desired effect. For example, a dimer of polyacrylamide having a molecular weight of about 144 and a trimer having a higher molecular weight can be advantageously used.

The amount of polyacrylamide or derivatives thereof or other water-soluble polymers can be widely changed according to the desired effect, but is preferably within a range from about 0.05 to 8% by weight, more preferably from 0.1 to 5% by weight, and most preferably from about 0.1 to 2% by weight, based on the total amount of the electrolytic solution. Although it varies depending on the molecular weight of polyacrylamide or derivatives thereof or other water-soluble polymers, the amount of 8% by weight or more, for example, the amount of about 10% by weight is not preferable because gelation of the electrolytic solution may occur.

In the practice of the present invention, the method of incorporating polyacrylamide or derivatives thereof (hereinafter referred to as "polyacrylamide") as a typical example of the water-soluble polymer into the electrolytic solution is not specifically limited and various methods can be employed as far as the desired effect can be obtained. Preferable methods will now be described.

1) Direct Addition of Polyacrylamide and Others It is possible to directly add polyacrylamide to the electrolytic solution. When the content of water in the water-organic solvent-based solvent is high, solid polyacrylamide may be added and dissolved in the electrolytic solution while stirring.

2) Addition of Aqueous Solution of Polyacrylamide and Others

In many cases, polyacrylamide is previously dissolved in water to obtain an aqueous several to several tens of % solution, and then the resulting aqueous solution can be added to the electrolytic solution. This method is a most easy method, which reduces external pollution and error, in case of treating polyacrylamide.

3) Addition of Polyacrylamide and Others while Taking Care of Viscosity of Electrolytic Solution When polyacrylamide is used after dissolving in the electrolytic solution, it is necessary to take care of the viscosity of the electrolytic solution caused by the addition of polyacrylamide. As the electrolytic solution of the present invention is a low-resistance, that is, highly-conductive electrolytic solution, it is not preferred that migration of ions involved in conductivity is inhibited by an increase in solution viscosity. In the polymer-containing electrolytic solution, agglomeration of (salting out) of the polymer may be caused by the interaction of electrolyte ions in the solution, and therefore the solution must be prepared taking accounts of the concentration of the electrolyte and polymer. For the above reason, the above-described proper range exists in the molecular weight and the amount of polyacrylamide to be added to the electrolytic solution.

4) Addition of Polyacrylamide and Others Having Small Molecular Weight

With respect to the electrolytic solution using a water-organic solvent-based solvent having comparatively small water content, polyacrylamide having a small molecular weight is preferably added because of a relation between the molecular weight and the solubility of polyacrylamide. As a matter of course, this method can be employed with respect to the electrolytic solution using a water-organic solvent-based solvent having large water content.

5) Other Method for Addition of Polyacrylamide and Others

A capacitor element, which is not impregnated with the electrolytic solution, may be previously impregnated or coated with polyacrylamide, or polyacrylamide may be dispersed in an adhesive used for fixing the element. Even if any method is employed, polyacrylamide can gradually migrate to the electrolytic solution from the contact area between the capacitor element and the electrolytic solution. Alternatively, polyacrylamide can be applied to the electrolytic solution by impregnating the capacitor element impregnated with the electrolytic solution with a solution of polyacrylamide or coating the capacitor element with the solution of polyacrylamide.

6) Dissolution of Polyacrylamide and Others by Changing the Solubility of Solvent Polyacrylamide is dissolved in the electrolytic solution in the state where the solubility of the solvent is remarkably changed by using plural solvents in combination. An example thereof is an electrolytic solution using a three component-based solvent containing methanol, ethylene glycol and water.

7) Dissolution of Polyacrylamide and Others in the Presence of Surfactant (Surface-active Agent)

When polyacrylamide is dissolved in the electrolytic solution, it is effective to add surfactants (for example, ionic surfactants such as dodecyl sulfate, and nonionic surfactants such as polyether derivative).

8) Addition of Polydispersible Polyacrylamide and Others

It is also effective to add polyacrylamide having a wide molecular weight distribution, that is, polydispersible polyacrylamide. The polydispersible polyacrylamide shows large solubility in the electrolytic solution.

9) Dependence on Cleavage of Polymer Chain of Polyacrylamide and Others

When polyacrylamide having a molecular weight, which is slightly soluble in an electrolytic solution, is previously fed in the capacitor element and furthermore the capacitor element is impregnated with the electrolytic solution to obtain a capacitor, a polymer molecular chain is cleaved by allowing polyacrylamide to stand in the electrolytic solution, and thus polyacrylamide is dissolved in the electrolytic solution. This dissolution is influenced by the kind of the solvent (as the water content increases, the polymer molecular chain is cleaved more easily) and the electrolyte, and the ambient temperature (as the ambient temperature becomes higher, the polymer molecular chain is cleaved more easily).

The electrolytic solution of the present invention may contain additives, which are conventionally used in the field of the aluminum electrolytic capacitor or the other electrolytic capacitor, in addition to various additives described above. Examples of preferable conventionally used additives include hydroxybenzyl alcohol, gluconic acid, gluconolactone, water-soluble silicone, and polymer electrolyte.

For example, the electrolytic solution of the present invention can contain hydroxybenzyl alcohol such as 2-hydroxybenzyl alcohol, L-glutamic acid diacetic acid, or a salt thereof. Hydroxybenzyl alcohol can be usually added in the amount within a range from about 0.01 to 5% by weight based on the total amount of the electrolytic solution. Hydroxybenzyl alcohol can exert effects such as prolongation of work life due to inhibition of the hydration reaction of an Al electrode foil of a low-impedance capacitor, improvement in characteristics at low temperature of an electrolytic capacitor (a change between an impedance at normal temperature and that at low temperature decreases because the solvent has compositions close to those corresponding to a non-frozen state).

If necessary, the electrolytic solution of the present invention can contain gluconic acid and gluconic lactone alone or in combination. Such an additive can be usually added in the amount within a range from about 0.01 to 5% by weight based on the total amount of the electrolytic solution. When the electrolytic solution of the present invention additionally contain gluconic acid and gluconic lactone, they can exert can exert a remarkable effect such as improvement in corrosion resistance, in addition to prolongation of working life and improvement in stability at low temperature of an electrolytic capacitor as well as hydrogen gas absorption function.

The electrolytic solution of the present invention can be prepared by mixing the above-described components in optional order and dissolving them. Basically, a conventional technique can be employed as it is or after modification. For example, it can be simply prepared by preparing a solvent having a high water content, which is a mixture of an organic solvent and water, and adding optional additives such as an elctrolyte and others to the resulting solvent. As polyacrylamide used as a water-soluble polymer can be introduced into the electrolytic solution using various methods as described above, working of the present invention has large degree of freedom.

In another aspect thereof, the present invention resides in an electrolytic capacitor comprising an electrolytic solution and capacitor constituent features other than the electrolytic solution (in the specification of the present application, these constituent features are referred to as "capacitor elements") in which the above-described electrolytic solution of the present invention is used for driving purpose. The electrolytic capacitor of the present invention preferably comprises anode and cathode foils each comprising a dielectric, which are disposed opposite each other, a separator (release paper) interposed between those foils, and the electrolytic solution of the present invention.

The electrolytic capacitor of the present invention is more preferably an aluminum electrolytic capacitor. The aluminum electrolytic capacitor of the present invention can be formed, for example, by using the above-described constituent features in combination.

As the electrolytic solution of the present invention is used in the electrolytic capacitor of the present invention it can exert various remarkable effects such as improvement in characteristics at low temperature due to the use of a solvent comprising water or a solvent mixture of an organic solvent and water, prolongation of the working life due to the addition of a water-soluble polymer such as polyacrylamide or a derivative thereof, stable capacitor characteristics in a temperature range from low temperature to high temperature, prolongation of working life due to inhibition of the hydration reaction through the use of a specific electrolyte, and realization of a low-impedance capacitor. The electrolytic solution of the present invention has sufficient characteristics for a reflow compatible type chip capacitor.

The electrolytic capacitor of the present invention can be actually used in a wide temperature range, but is advantageously used at a temperature range from the temperature just above the freezing temperature, about $-40°$ C., of the electrolytic solution to a temperature of about $125°$ C. at which a solute in the electrolytic solution does not deteriorate. The electrolytic capacitor can be preferably used at the temperature within a range from $-25$ to $115°$ C., and preferably from about $-20$ to $110°$ C.

The aluminum electrolytic capacitor of the present invention is preferably formed so that a capacitor element formed by winding an anode foil, wherein the surface of an etched aluminum foil is anodized, and a cathode foil made of the etched aluminum foil via a release paper so that surfaces of the both face each other, and an electrolyte solution of the present invention, are contained in a case and, furthermore, an opening portion of the case containing the capacitor element is sealed.

Figure 2:
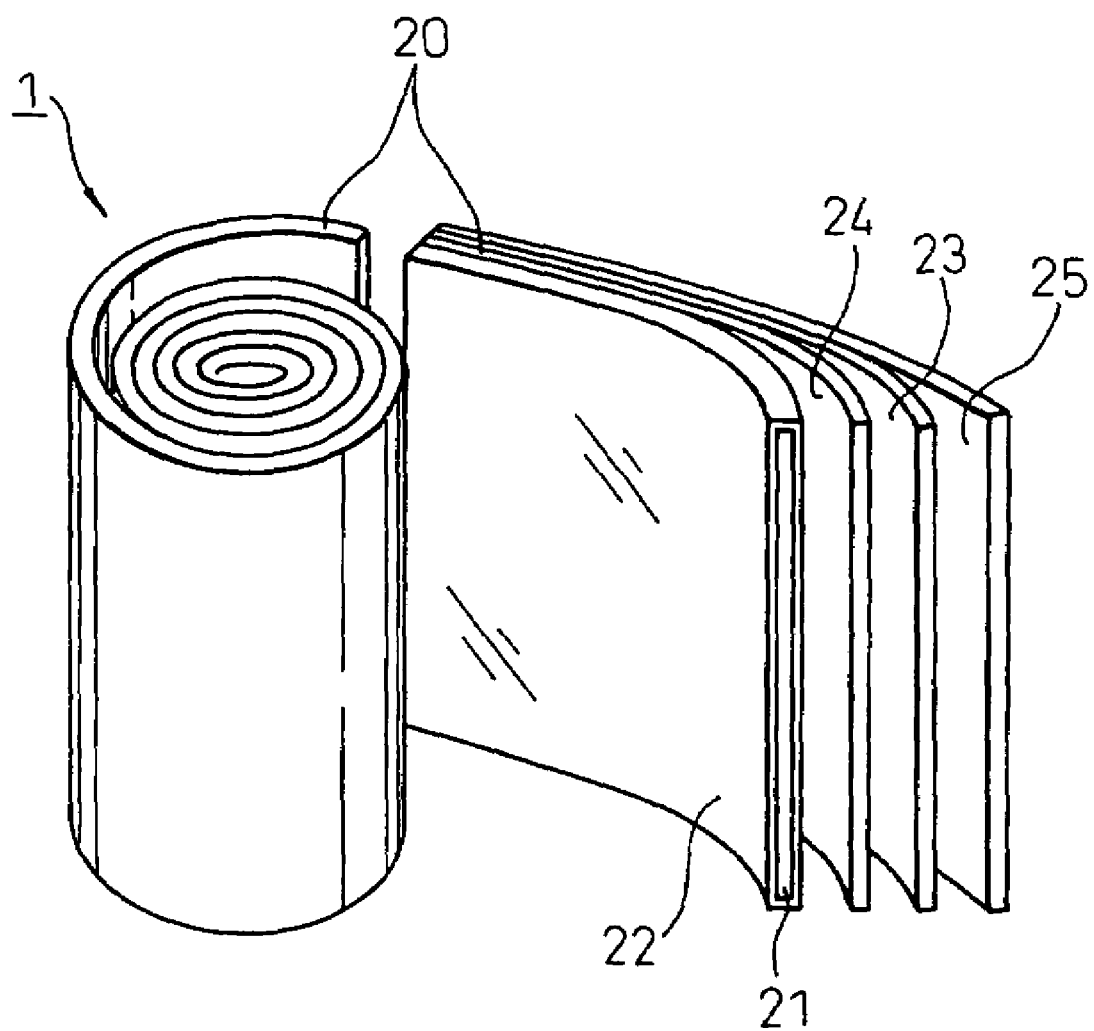
FIG. 2 is an exploded perspective view showing the constitution of a capacitor element of the electrolytic capacitor shown in FIG. 1.

FIG. 1 is a sectional view showing an example of the electrolytic capacitor of the present invention, and FIG. 2 is a perspective view enlarged partially in the thickness direction, which shows a capacitor element of the electrolytic capacitor shown in FIG. 1. Although the illustrated embodiment is an electrolytic capacitor with a wound structure, various changes and modifications may be made in the electrolytic capacitor of the present invention without departing from the spirit and scope thereof. The electrolytic capacitor of the present invention may be an electrolytic capacitor wherein both of electrode foils constituting the capacitor have an oxide film, or an electrolytic capacitor comprising electrode foils whose surface is coated with an organic or inorganic compound capable of exerting an effective function on capacitor characteristics or coated with a functional substance such as silane coupling agent. As a mater of course, electrolytic capacitors other than an electrolytic capacitor with a wound structure are included in the present invention.

An illustrated electrolytic capacitor 10 is an aluminum electrolytic capacitor and has such a structure that a capacitor element 1 impregnated with an electrolytic solution is contained in a metal case 4 and an opening portion of the case 4 is sealed with a sealant 3. The capacitor element 1 contained in the metal case is in the form of a wound sheet-like laminate 20. The laminate 20 comprises, as illustrated, an aluminum foil (anode) 21 having an oxide film 22 over the entire surface thereof, an aluminum foil (cathode) 23, a first separator 24 interposed between these electrodes, and a second separator 25. The first separator 24 and the second separator 25 may be the same or different. The capacitor element 1 is impregnated with an electrolyte solution.

The electrolytic capacitor shown in FIGS. 1 and 2 can be produced, for example, by the following procedure.

First, an anode foil, wherein an oxide film is provided over the entire surface by anodizing the surface of a high-purity aluminum foil as a raw material, and a cathode film whose surface area is increased by etching the surface are made. Then, the resulting anode foil and cathode foil are disposed facing each other and a separator is interposed between those films to form a laminate, thereby making an element with a structure obtained by winding this laminate, that is, a capacitor element.

Subsequently, the resulting capacitor element is impregnated with an electrolyte solution and the capacitor element impregnated with the electrolyte solution is contained in a metal case, and then an opening portion of the case is sealed with a sealant. Two lead wires are inserted into a lead wire-penetrating hole of the sealer, thereby to completely seal it so that leakage of the electrolyte solution does not occur.

The electrolytic capacitor of the present invention will be described in more detail hereinafter. The aluminum foil used as the anode foil and cathode foil is preferably an aluminum foil having high purity of 99% or more. The anode foil can be preferably formed by electrochemically etching the aluminum foil, anodizing it to form an oxide film on the surface, and attaching a lead tab for leading an electrode. The cathode film can be formed by etching the aluminum foil and attaching a lead tab for leading an electrode.

The capacitor element can be obtained by winding the anode and cathode foils thus formed via a separator while surfaces face each other. The separator used to make the capacitor element can be preferably made of a natural or synthetic cellulose material. Examples of the separator include, but are not limited to, paper produced by using naturally produced cellulose materials such as Manila hemp and wood pulp as a raw material; and woven fabric, nonwoven fabric, sheet and film produced by using synthetic fibers such as rayon, nylon, polyester, polyvinyl compound, aramid, acryl and polyurethane fibers. There can also be used products obtained by mixing of natural and synthetic fibers.

The separator can be produced by fixing the above-described fibrous raw material with a soluble binder in an electrolytic solution. In other words, the separator can contain a binder such as water-soluble polymer or adhesive. The working life of the electrolytic capacitor could be remarkably improved by using the separator containing the water-soluble polymer or adhesive in combination with the electrolytic solution of the present invention. Specific examples of the binder include polyacrylamide, polyacrylic acid, adhesive, starch and polyvinyl alcohol.

The separator preferably has a space in which ions are capable of migrating between the electrode foils even under low temperature conditions, and also it preferably has a density of 0.5 or less. By decreasing the density, not only can the ESR of the electrolytic capacitor be decreased, but also a large amount of the electrolytic solution can be retained to thereby improve the working life. The density of the separator is more preferably 0.4 or less, still more preferably 0.35 or less, and most preferably 0.3 or less. The density of the separator of 0.35 or less is particularly effective because the change in ESR at a low temperature can be decreased.

The case containing the capacitor element may be an aluminum case, which has conventionally been used, but is preferably made of a metallic material having sufficient strength. Preferred case materials include non-heat-treated aluminum having purity of 99.0% or higher, for example, non-heat-treated aluminum 1100 or H22 material (1000 aluminum alloy); or aluminum alloy, especially aluminum alloy containing manganese (Mn) and/or magnesium (Mg), for example, aluminum alloy 3003, O material or H22 material (3000 aluminum alloy) or 3004, O material.

The sealant used in the electrolytic capacitor of the present invention can be formed from various materials as long as the material has high hardness and proper rubber elasticity, and it is also impermeable to an electrolyte solution and has good airtightness for the sealer. Preferred sealant material includes, for example, elastic rubber such as natural rubber (NR), styrene-butadiene (SBR), ethylene-propylene terpolymer (EPT), and isobutylene-isoprene rubber (IIR). The isobutylene-isoprene rubber (IIR) is preferably used because the airtightness is high and the electrolyte solution does not penetrate in the form of vapor. Vulcanized IIR having more excellent heat resistance, for example, sulfur-vulcanized, quinoid-vulcanized, resin-vulcanized or peroxide-vulcanized IIR is used more preferably. By using these sealant, high gas barrier characteristics (airtightness) and sealant strength due to high hardness characteristics can be attained simultaneously.

In the practice of the present invention, a hybrid material obtained by laminating a resin material plate having sufficient airtightness and strength (e.g. fluororesin plate such as PTFE plate) can be advantageously used in place of the above-described sealer material.

Furthermore, lead wires which are used as external connection terminals of external electrode terminals and are inserted into a lead wire-penetrating hole of the sealer, can be formed from metallic materials such as iron, copper, tin, lead, silver, gold, zinc, bismuth, tungsten, nickel, titanium and chromium. For the purpose of decreasing the ESR, lead wires are advantageously formed from highly-conductive metallic materials such as copper, silver, iron and gold, and are particularly advantageously made from a copper or silver wire.

EXAMPLES

The following examples further describe the present invention in detail. These examples are to be construed as illustrative and not as restrictive.

Example 1

An aluminum electrolytic capacitor with a wound structure was produced in accordance with the following procedure.

First, a high-purity aluminum foil was electrochemically etched to form an oxide film over the entire surface of the aluminum foil, and then a lead tab as an electrode was attached to make an aluminum anode foil. Regarding the lead tab used herein, the connection portion with the aluminum foil was made of an aluminum material and the external terminal was made of a copper material. Another aluminum foil was also electrochemically etched and the same lead tab as an electrode was attached to make an aluminum cathode foil. Subsequently, a capacitor element was made by interposing a separator made of natural fibers between the anode foil and the cathode foil, followed by winding.

The capacitor element was impregnated with an electrolyte solution whose compositions were shown in Table 1 below and contained in an aluminum case with a base so that the lead tab for leading an electrode is exposed out of the case, and then an opening of this case was sealed with an elastic sealant to make an electrolytic capacitor with a wound structure (10WV-470 μF). The sealer was made of an isobutylene-isoprene rubber (IIR).

Examples 2 to 28

The same procedure as in Example 1 was repeated to obtain aluminum electrolytic capacitors, except that compositions of the electrolyte solution to be used were changed as described in Table 1 below in case of this example.

Comparative Examples 1 to 7

The same procedure as in Example 1 was repeated to obtain aluminum electrolytic capacitors, except that compositions of the electrolyte solution to be used were changed, as described in Table 2 below, for comparison purpose.

TABLE 1

| Examples | Components | % by weight |
|---|---|---|
| Example 1 | Water | 35 |
| | Ethylene glycol | 53 |
| | Ammonium adipate | 10 |
| | Phosphoric acid | 0.5 |
| | Ammonium citrate | 0.1 |
| | Nitrophenol | 1.4 |
| | S.R.30 = 56.2 | 100 |
| Example 2 | Water | 81 |
| | Ethylene glycol | 9 |
| | Ammonium adipate | 4 |
| | Ammonium formate | 1 |
| | Phosphoric acid | 2 |
| | Ammonium borodisalicylate | 1 |
| | Nitrobenzoic acid | 1 |
| | Diethylenetriaminepentaacetic acid (DTPA) | 0.5 |
| | Gluconic lactone | 0.5 |
| | S.R.30 = 26.7 | 100 |
| Example 3 | Water | 95 |
| | Ammonium adipate | 3 |
| | Phosphoric acid | 1 |
| | Ammonium citrate | 0.1 |
| | Dinitrophenol | 0.7 |
| | Gluconic lactone | 0.1 |
| | Ethylenediaminetetraacetic acid (EDTA) | 0.1 |
| | S.R.30 = 34.1 | 100 |
| Example 4 | Water | 49.2 |
| | Ethylene glycol | 32.8 |
| | Ammonium adipate | 14.4 |
| | Ammonium dihydrogen phosphate | 1.1 |
| | Citric acid | 0.4 |
| | Dinitrobenzoic acid | 1.3 |
| | EDTA | 0.8 |
| | S.R.30 = 26.2 | 100 |
| Example 5 | Water | 27.6 |
| | Ethylene glycol | 48.9 |
| | Ammonium adipate | 15.1 |
| | Ammonium borate | 4 |
| | Ammonium dihydrogen phosphate | 2 |
| | Citric acid | 0.7 |
| | Nitrobenzoic acid | 1 |
| | Fructose | 0.7 |
| | S.R.30 = 61.6 | 100 |
| Example 6 | Water | 55 |
| | Ethylene glycol | 14 |
| | Ammonium adipate | 5 |
| | Ammonium glutarate | 20 |
| | Ammonium phosphate | 2 |
| | Citric acid | 0.7 |
| | m-nitroacetophenone | 0.1 |
| | DTPA | 1.3 |
| | Nitrophenol | 1.9 |
| | S.R.30 = 11.1 | 100 |
| Example 7 | Water | 64 |
| | Ethylene glycol | 11 |
| | Ammonium adipate | 15 |
| | Ammonium sulfamate | 3 |
| | Ammonium hypophosphite | 2 |
| | Ammonium citrate | 1 |
| | Nitroanisole | 2 |
| | Dihydroxyethylglycine (DHEG) | 1 |
| | Polyacrylamide (molecular weight = 2,000) | 1 |
| | S.R.30 = 12.5 | 100 |
| Example 8 | Water | 98.4 |
| | Ammonium adipate | 1 |
| | Ammonium formate | 0.3 |
| | Phosphoric acid | 0.1 |
| | P-nitrobenzoic acid | 0.1 |
| | EDTA | 0.1 |
| | S.R.30 = 60.7 | 100 |
| Example 9 | Water | 26.5 |
| | Ethylene glycol | 52 |
| | Ammonium adipate | 20 |
| | P-nitrophenol | 1.5 |
| | S.R.30 = 45.2 | 100 |
| Example 10 | Water | 53 |
| | Ethylene glycol | 7 |
| | Ammonium adipate | 25 |
| | Ammonium borate | 11 |
| | Phosphoric acid | 1 |
| | Ammonium citrate | 0.5 |
| | Nitrobenzoic acid | 1 |
| | EDTA | 0.3 |
| | Gluconic lactone | 0.2 |
| | Polyacrylamide (molecular weight = 200,000) | 1 |
| | S.R.30 = 11.2 | 100 |
| Example 11 | Water | 57.0 |
| | Ammonium sulfamate | 28.0 |
| | Ammonium formate | 13.0 |
| | Phosphoric acid | 1.0 |
| | P-nitrobenzoic acid | 1.0 |
| | S.R.30 = 4.0 | 100 |
| Example 12 | Water | 56 |
| | Ethylene glycol | 15 |
| | Ammonium adipate | 10 |
| | Ammonium gluconate | 13 |
| | Ammonium dihydrogen phosphate | 1 |
| | Citric acid | 0.5 |
| | Nitrophenol | 1 |
| | DTPA | 0.3 |
| | N-β(aminoethyl)γ-aminopropyl | 0.2 |
| | Polyacrylamide (molecular weight = 100,000) | 3 |
| | S.R.30 = 12.1 | 100 |
| Example 13 | Water | 35 |
| | Ethylene glycol | 30 |
| | Ammonium adipate | 18 |
| | Ammonium borate | 8 |
| | Ammonium gluconate | 4 |
| | Ammonium dihydrogen phosphate | 2 |
| | Citric acid | 0.4 |
| | Nitrophenol | 0.7 |
| | m-nitroacetophenone | 0.7 |
| | Mannitol | 0.2 |
| | Polyacrylamide (molecular weight = 10,000) | 1 |
| | S.R.30 = 36.5 | 100 |
| Example 14 | Water | 90 |
| | Ethylene glycol | 5 |
| | Ammonium adipate | 2.5 |
| | Ammonium phosphate | 0.5 |
| | Citric acid | 0.3 |
| | Nitrophenol | 0.5 |
| | EDTA | 0.3 |
| | Gluconic lactone | 0.1 |
| | Polyacrylamide (molecular weight = 200,000) | 0.9 |
| | S.R.30 = 50 | 100 |
| Example 15 | Water | 40 |
| | Ethylene glycol | 40 |
| | Ammonium adipate | 17 |
| | Ammonium phosphate | 1 |
| | Ammonium citrate | 0.5 |
| | Nitrobenzoic acid | 0.5 |
| | DTPA | 0.1 |
| | Xylose | 0.1 |
| | Polyacrylamide (molecular weight = 2,000) | 0.8 |
| | S.R.30 = 33.0 | 100 |
| Example 16 | Water | 61.3 |
| | Ethylene glycol | 14.4 |
| | Ammonium adipate | 20.4 |
| | Phosphoric acid | 1.5 |
| | Ammonium citrate | 0.2 |
| | Nitrophenol | 1.1 |
| | EDTA | 0.8 |
| | Gluconolactone | 0.3 |
| | S.R.30 = 13.8 | 100 |
| Example 17 | Water | 62.1 |
| | Ethylene glycol | 13.6 |
| | Ammonium adipate | 6.8 |
| | Ammonium formate | 13.6 |
| | Phosphoric acid | 1.5 |
| | Ammonium citrate | 0.2 |
| | Nitrobenzoic acid | 1.1 |

TABLE 1-continued

| Examples | Components | % by weight |
|---|---|---|
| | DTPA | 0.8 |
| | EDTA | 0.3 |
| | S.R.30 = 8.9 | 100 |
| Example 18 | Water | 65.6 |
| | Ethylene glycol | 12.5 |
| | Ammonium adipate | 11.7 |
| | Ammonium formate | 6.2 |
| | Phosphoric acid | 1.6 |
| | Ammonium citrate | 0.2 |
| | Nitrobenzoic acid | 1.2 |
| | EDTA | 0.8 |
| | Mannite | 0.3 |
| | S.R.30 = 10.2 | 100 |
| Example 19 | Water | 60.2 |
| | Ethylene glycol | 9.8 |
| | Ammonium adipate | 10.5 |
| | Ammonium formate | 5.6 |
| | Ammonium dihydrogen phosphate | 11.9 |
| | Citric acid | 0.1 |
| | n-nitroacetophenone | 1.0 |
| | Ethylenediaminediacetic acid (EDDA) | 0.7 |
| | Gluconolactone | 0.1 |
| | S.R.30 = 13.7 | 100 |
| Example 20 | Water | 69.1 |
| | Ethylene glycol | 9.4 |
| | Ammonium adipate | 6.3 |
| | Ammonium formate | 11.8 |
| | Ammonium dihydrogen phosphate | 1.2 |
| | Citric acid | 0.2 |
| | Nitrobenzoic acid | 1.3 |
| | EDDA | 0.8 |
| | S.R.30 = 7.2 | 100 |
| Example 21 | Water | 69.6 |
| | Ethylene glycol | 7.7 |
| | Ammonium adipate | 10.0 |
| | Ammonium formate | 9.3 |
| | Ammonium phosphate | 1.2 |
| | Citric acid | 0.2 |
| | Nitrophenol | 0.1 |
| | DTPA | 0.8 |
| | Nitrobenzoic acid | 1.2 |
| | S.R.30 = 8.3 | 100 |
| Example 22 | Water | 68.4 |
| | Ethylene glycol | 6.8 |
| | Ammonium adipate | 20.3 |
| | Phosphoric acid | 1.5 |
| | Ammonium citrate | 0.7 |
| | Nitrophenol | 1.1 |
| | EDTA | 0.8 |
| | Hypophosphorous acid | 0.3 |
| | Phosphorous acidtrimethyl | 0.2 |
| | S.R.30 = 9.9 | 100 |
| Example 23 | Water | 67.5 |
| | Ethylene glycol | 5.1 |
| | Ammonium adipate | 8.0 |
| | Ammonium formate | 15.9 |
| | Ammonium phosphate | 1.2 |
| | Citric acid | 0.1 |
| | Nitrobenzoic acid | 1.1 |
| | DTPA | 0.7 |
| | Dinitrosobenzoic acid | 0.3 |
| | Polyacrylamide (molecular weight = 2,000) | 0.7 |
| | S.R.30 = 11.1 | 100 |
| Example 24 | Water | 68.6 |
| | Ethylene glycol | 3.6 |
| | Ammonium adipate | 8.0 |
| | Ammonium formate | 15.9 |
| | Phosphoric acid | 1.1 |
| | Ammonium citrate | 0.1 |
| | Nitrobenzoic acid | 1.1 |
| | EDTA | 0.9 |
| | Polyacrylamide (molecular weight = 200,000) | 0.7 |
| | S.R.30 = 5.3 | 100 |
| Example 25 | Water | 66.6 |
| | Ethylene glycol | 2.1 |
| | Ammonium adipate | 10.3 |
| | Ammonium formate | 17.2 |
| | Ammonium dihydrogen phosphate | 1.2 |
| | Citric acid | 0.1 |
| | Dinitrophenol | 1.0 |
| | EDDA | 0.7 |
| | Gluconic lactone | 0.1 |
| | Polyacrylamide (molecular weight = 200,000) | 0.7 |
| | S.R.30 = 6.2 | 100 |
| Example 26 | Water | 71.0 |
| | Ethylene glycol | 0.7 |
| | Ammonium adipate | 4.8 |
| | Ammonium formate | 4.8 |
| | Ammonum sulfamate | 14.8 |
| | Ammonium dihydrogen phosphate | 1.2 |
| | Citric acid | 0.1 |
| | Nitrophenol | 1.1 |
| | EDTA | 0.7 |
| | Gluconic lactone | 0.1 |
| | Polyacrylamide (molecular weight = 10,000) | 0.7 |
| | S.R.30 = 4.6 | 100 |
| Example 27 | Water | 72.3 |
| | Ammonium adipate | 5.3 |
| | Ammonium formate | 7.9 |
| | Ammonium sulfamate | 10.7 |
| | Ammonium phosphate | 1.2 |
| | Citric acid | 0.1 |
| | Nitrophenol | 1.1 |
| | EDTA | 0.7 |
| | Mannitol | 0.1 |
| | Polyacrylamide (molecular weight = 2,000) | 0.7 |
| | S.R.30 = 4.5 | 100 |
| Example 28 | Water | 88.6 |
| | Ammonium adipate | 7.0 |
| | Ammonium phosphate | 1.0 |
| | Citric acid | 0.3 |
| | Nitrophenol | 1.8 |
| | EDTA | 0.9 |
| | Gluconic lactone | 0.1 |
| | S.R.30 = 20.0 | 100 |

TABLE 2

| Examples | Components | % by weight |
|---|---|---|
| Comparative Example 1 | Water | 49.3 |
| | Ammonium adipate | 0.5 |
| | Ammonium formate | 49.3 |
| | Phosphoric acid | 0.5 |
| | Nitrobenzoic acid | 0.5 |
| | Not dissolved | 100 |
| Comparative Example 2 | Water | 27.5 |
| | Ethylene glycol | 27.5 |
| | Ammonium formate | 44.1 |
| | Hypophosphorous acid | 0.3 |
| | Nitrophenol | 0.6 |
| | Not dissolved | 100 |
| Comparative Example 3 | Water | 16.5 |
| | Ethylene glycol | 38.5 |
| | Ammonium formate | 44.0 |
| | Ammonium adipate | 0.2 |
| | Nitrobenzoic acid | 0.6 |
| | Ammonium borate | 0.1 |
| | EDTA | 0.2 |
| | Not dissolved | 100 |
| Comparative Example 4 | Water | 9.7 |
| | Ethylene glycol | 80.6 |
| | Ammonium adipate | 8.9 |
| | p-nitrophenol | 0.8 |
| | S.R.30 = 190.0 | 100 |
| Comparative Example 5 | Water | 9.4 |
| | Ethylene glycol | 78.7 |
| | Ammonium formate | 5.5 |
| | Ammonium adipate | 5.5 |

TABLE 2-continued

| Examples | Components | % by weight |
|---|---|---|
| | EDTA | 0.8 |
| | S.R.30 = 103.0 | 100 |
| Comparative Example 6 | Water | 12.3 |
| | Ethylene glycol | 76.9 |
| | Ammonium adipate | 10.0 |
| | Hypophosphorous acid | 0.8 |
| | S.R.30 = 150.0 | 100 |
| Comparative Example 7 | Water | 54.0 |
| | Ammonium formate | 44.5 |
| | Ammonium adipate | 1.0 |
| | p-nitrophenol | 0.5 |
| | S.R.30 = 3.6 | 100 |

Test Example 1

With respect to the aluminum electrolytic capacitors obtained in Examples 1 to 28 and Comparative Examples 4 to 7, the following measurements were carried out. In case of Comparative Examples 1 to 3, the resulting electrolytic capacitors could not be subjected to the test because of defects of the electrolyte solution (not dissolved).

(1) Measurement of Specific Resistance

The specific resistance at 30° C. (S.R.30: Ω·Cm) of the electrolyte solutions prepared in the respective examples was measured to obtain measured values as described in Table 3 below. S.R.30 is also described in Tables 1 and 2 described above.

(2) Evaluation of Working Life

To evaluate the working life of the aluminum electrolytic capacitors obtained in the respective examples, measurement of an initial value (characteristic value immediately after making a capacitor), measurement of a characteristic value and observation of appearance (25° C.) after subjected to a load test (after the capacitor was allowed to stand at 105° C. for 500 hours under application of a rated voltage of 10 V) were carried out with respect to the capacitance, tan δ and leakage current (L.C.: current value measured after one minute has passed since the application of a rated voltage of 10 V). The capacitance and tan δ were measured at a frequency of 120 Hz. As a result, measured values, as described in Table 3 below, were obtained.

TABLE 3

100 WV-470 μF

| | Specific resistance at 30° C. [Ω·Cm] | Initial value | | | After 500 hours at 105° C. | | | |
|---|---|---|---|---|---|---|---|---|
| Examples | | Capacitance [μF] | Tan δ [%] | Leakage current [μA] | Capacitance [μF] | Tan δ [%] | Leakage current [μA] | Appearance |
| Comparative Example 4 | 190 | 474 | 8.9 | 5.6 | 431 | 9.2 | 2.3 | Up to standard |
| Comparative Example 5 | 103 | 476 | 5.9 | 5.1 | 438 | 6.5 | 2.4 | Up to standard |
| Comparative Example 6 | 150 | 475 | 7.5 | 5.4 | 432 | 7.9 | 2.5 | Up to standard |
| Comparative Example 7 | 3.6 | 476 | 2.4 | 6.2 | In all samples, abnormality in characteristics was recognized within 48 hours, operation of safety vent | | | |
| Example 1 | 56.2 | 474 | 4.2 | 5.7 | 417 | 4.5 | 2.3 | Up to standard |
| Example 2 | 26.7 | 474 | 3.2 | 5.5 | 417 | 3.5 | 2.2 | Up to standard |
| Example 3 | 34.1 | 475 | 3.4 | 5.4 | 418 | 3.7 | 2.2 | Up to standard |
| Example 4 | 26.2 | 475 | 3.2 | 5.8 | 418 | 3.6 | 2.1 | Up to standard |
| Example 5 | 61.6 | 476 | 4.4 | 5.8 | 419 | 4.6 | 2.2 | Up to standard |
| Example 6 | 11.1 | 477 | 2.6 | 5.6 | 420 | 3.0 | 2.2 | Up to standard |
| Example 7 | 12.5 | 475 | 2.7 | 5.5 | 418 | 3.2 | 2.2 | Up to standard |
| Example 8 | 60.7 | 478 | 4.4 | 5.7 | 421 | 4.8 | 2.2 | Up to standard |
| Example 9 | 45.2 | 476 | 3.8 | 5.6 | 419 | 4.2 | 2.2 | Up to standard |
| Example 10 | 11.2 | 478 | 2.6 | 5.5 | 421 | 3.3 | 2.4 | Up to standard |
| Example 11 | 129 | 478 | 2.4 | 5.9 | 421 | 2.9 | 2.5 | Up to standard |
| Example 12 | 12.1 | 479 | 2.7 | 6 | 422 | 3.4 | 2.6 | Up to standard |
| Example 13 | 36.5 | 477 | 3.5 | 5.8 | 420 | 4.1 | 2.4 | Up to standard |
| Example 14 | 31.3 | 475 | 3.3 | 5.5 | 418 | 3.7 | 2.2 | Up to standard |
| Example 15 | 33.0 | 478 | 3.4 | 5.7 | 421 | 3.7 | 2.7 | Up to standard |
| Example 16 | 13.8 | 477 | 2.7 | 5.7 | 420 | 3.3 | 2.3 | Up to standard |
| Example 17 | 8.9 | 475 | 2.6 | 5.9 | 418 | 3.4 | 2.2 | Up to standard |
| Example 18 | 10.2 | 475 | 2.6 | 5.9 | 418 | 3.3 | 2.2 | Up to standard |
| Example 19 | 13.7 | 478 | 2.7 | 5.9 | 421 | 3.4 | 2.1 | Up to standard |
| Example 20 | 7.2 | 476 | 2.5 | 5.8 | 419 | 3.1 | 2.2 | Up to standard |
| Example 21 | 8.3 | 477 | 2.5 | 5.7 | 420 | 3.2 | 2.2 | Up to standard |
| Example 22 | 9.9 | 477 | 2.6 | 5.5 | 420 | 3.3 | 2.2 | Up to standard |
| Example 23 | 11.0 | 477 | 2.6 | 5.7 | 420 | 3.3 | 2.2 | Up to standard |
| Example 24 | 5.3 | 476 | 2.4 | 5.6 | 419 | 3.0 | 2.2 | Up to standard |
| Example 25 | 6.2 | 475 | 2.5 | 5.8 | 418 | 3.2 | 2.4 | Up to standard |
| Example 26 | 4.6 | 478 | 2.4 | 5.9 | 421 | 3.0 | 2.5 | Up to standard |
| Example 27 | 4.5 | 475 | 2.4 | 6 | 418 | 3.1 | 2.6 | Up to standard |
| Example 28 | 20 | 477 | 2.9 | 5.8 | 420 | 3.7 | 2.4 | Up to standard |

As is apparent from the test results described in Table 3, aluminum electrolytic capacitors having more excellent characteristics than those in case of Comparative Examples 4 to 7 could be obtained in Examples 1 to 28.

Test Example 2

With respect to aluminum electrolytic capacitors obtained in Comparative Examples 4 to 6 and Examples 4, 17, 24 and 27, ESR (mΩ, 100 kHz) was measured at different temperatures (−25° C., −10° C., 0° C., 20° C., 55° C., 85° C. and 105° C.). As a result, a graph shown in FIG. 3 was obtained.

Figure 3:
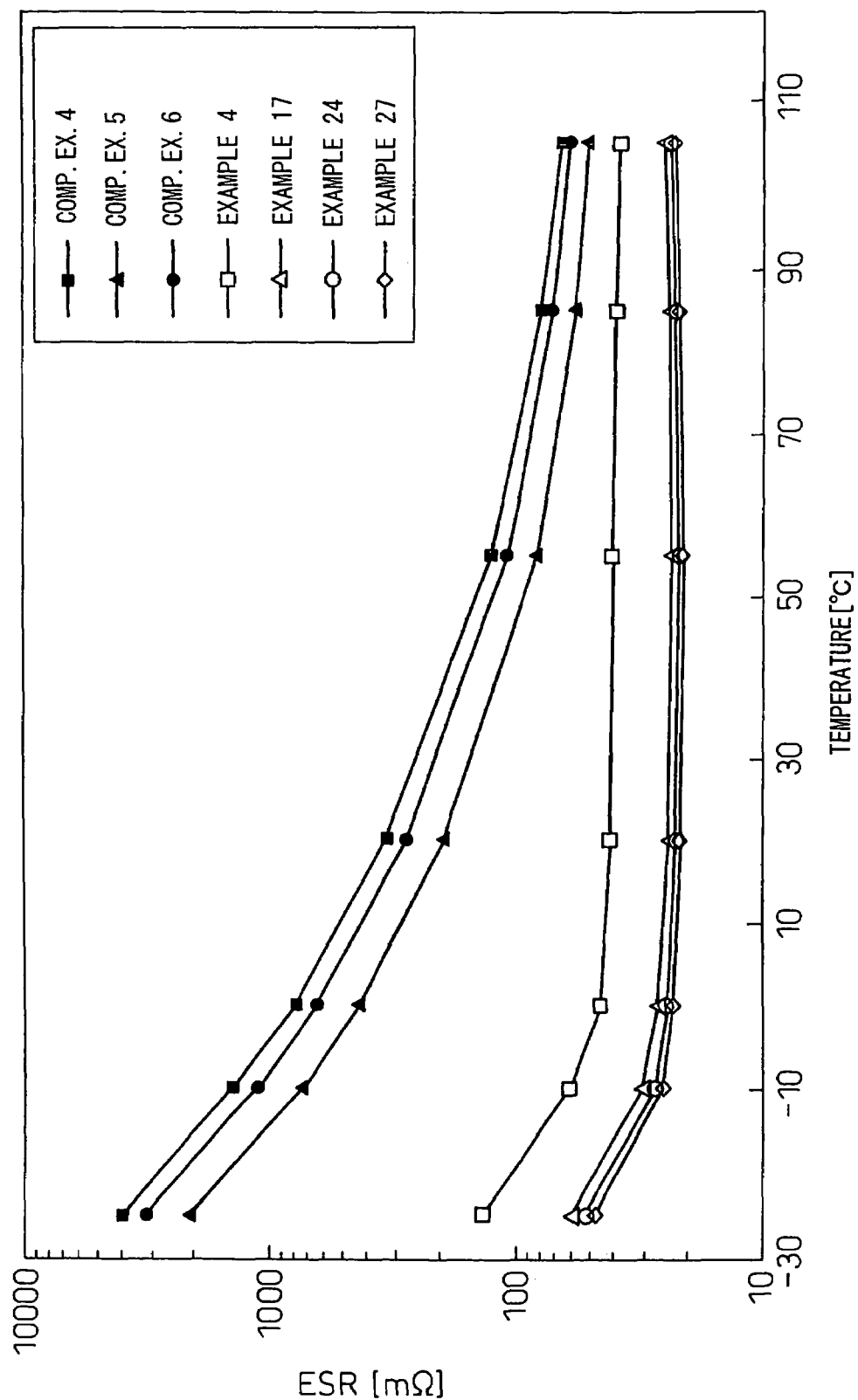
FIG. 3 is a graph showing a relation between the temperature and ESR with respect to the aluminum electrolytic capacitors produced in the examples and comparative examples.

As is apparent from a graph showing the relation between the temperature and ESR of FIG. 3, in case of the electrolytic capacitors of Examples 4, 17, 24 and 27 using the electrolytic solution of the present invention, ESR at 100 kHz is controlled to a low value as compared with the case of Comparative Examples 4 to 6. Furthermore, in case of the electrolytic capacitors of Examples 4, 17, 24 and 27, an ESR ratio slightly increases at −25° C. which is the temperature just before a freezing temperature. However, a change in ESR ratio is scarcely recognized at a temperature ranging from −10 to 105° C. This fact shows that the electrolytic capacitors using the electrolytic solution of the present invention show excellent stability at low temperature at a temperature ranging from 105 to −25° C.

Comparative Examples 8 and 9, Examples 29 to 31

The same procedure as in Example 1 was repeated to obtain aluminum electrolytic capacitors, except that the sealant and case were changed as described in Table 4 below so as to confirm the influence of the sealant and case to be used on working life of the capacitor in case of this example.

In Comparative Example 8 using the electrolytic solution of Example 21, a resin-vulcanized IIR sealant was used as the sealant and a conventional aluminum case was used as the case.

In Comparative Example 9 using the electrolytic solution of Example 21, an EPT sealant was used as the sealant and a conventional aluminum case was used as the case.

In Example 29 using the electrolytic solution of Example 21, a resin-vulcanized IIR sealant was used as the sealant and a non-heat-treated aluminum case was used as the case.

In Example 30 using the electrolytic solution of Example 21, a resin-vulcanized IIR sealant was used as the sealant and an aluminum alloy case was used as the case.

In Example 31 using the electrolytic solution of Example 21, a peroxide-vulcanized IIR sealant was used as the sealant and an aluminum alloy case was used as the case.

With respect to the aluminum electrolytic capacitors obtained in the respective examples, the working life was measured as described in Test Example 1. As a result, the measurement results described in Table 4 below were obtained.

TABLE 4

10 MV-1000 μF

| Examples | Electrolytic solution (Example No.) | Case material and sealant | Initial value | | | After 500 hours at 105° C. | | | |
|---|---|---|---|---|---|---|---|---|---|
| | | | Capacitance [μF] | tan δ [%] | Leakage current [μA] | Capacitance [μF] | Tan δ [%] | Leakage current [μA] | Case swelling |
| Comparative Example 8 | Example 21 | Conventional aluminum case Resin-vulcanized IIR | 1014 | 2.7 | 6.1 | 507 | 29.5 | 46.7 | 0.6 mm |
| Comparative Example 9 | Example 21 | Conventional case EPT rubber | 1008 | 2.7 | 5.6 | In all samples, operation of safety vent was caused by gas evolution within 500 hours. | | | |
| Example 29 | Example 21 | Non-heat-treated aluminum (H22 material) Resin-vulcanized IIR | 1044 | 2.5 | 7.8 | 919 | 3.1 | 3.3 | 0.3 mm |
| Example 30 | Example 21 | Aluminum alloy (3003-H22 material) Resin-vulcanized IIR | 1036 | 2.4 | 7.3 | 912 | 3.1 | 3.1 | 0.2 mm |
| Example 31 | Example 21 | Aluminum alloy (3004-H22 material) Peroxide-vulcanized IIR | 1028 | 2.3 | 7.1 | 905 | 3.0 | 3.2 | 0.2 mm |

As is apparent from the measurement results of Table 4, it became impossible to use the electrolytic capacitor of the Comparative Example 9 using the electrolyte solution of the present invention in combination with a conventional aluminum case and an EPT rubber because a safety vent operated before a lapse of 500 hours at 105° C. To the contrary, the electrolytic capacitors of Examples 29 to 31 using the electrolytic solution of the present invention, using a non-heat-treated aluminum case or an aluminum alloy case as a metal case and using a resin-vulcanized or peroxide-vulcanized butyl rubber as a sealant showed a good working life after a lapse of 500 hours at 105° C. This fact shows that the working life of the electrolytic capacitor is further improved by using a non-heat-treated aluminum case or an aluminum alloy case as a metal case and using a resin-vulcanized or peroxide-vulcanized butyl rubber as a sealant.

Comparative Example 10 and Example 32

The same procedure as in Example 1 was repeated to obtain aluminum electrolytic capacitors, except that a conventional natural fiber separator (containing no soluble binder such as polyacrylamide) was used as a separator in the aluminum electrolytic capacitor of Comparative Example 10 using the electrolytic solution of Example 28 as described in Table 5 below and a polyacrylamide binder-containing natural fiber separator was used as a separator in the aluminum electrolytic capacitor of Example 32 using the electrolytic solution of Example 28 so as to confirm the influence of the separator to be used on work life of the capacitor in case of this example.

With respect to the aluminum electrolytic capacitors obtained in the respective examples, working life was measured in accordance with the same procedure as in Example 1, except that a lapse time was prolonged from 500 hours to 1000 hours. As a result, the measurement results described in Table 5 below were obtained.

TABLE 6

| Examples | Density of separator (g/cm³) | Temperature (° C.) | | | | | | |
|---|---|---|---|---|---|---|---|---|
| | | 105 | 85 | 55 | 20 | 0 | −10 | −25 |
| Comparative Example 11 | 0.6 | 30.0 | 28.8 | 27.96 | 28.56 | 31.8 | 52.7 | 150.2 |
| Example 33 | 0.5 | 26.3 | 25.2 | 24.5 | 25.0 | 27.8 | 40.3 | 95.2 |
| Example 34 | 0.4 | 25.0 | 24.0 | 23.3 | 23.8 | 26.5 | 34.7 | 72.9 |
| Example 35 | 0.35 | 23.5 | 22.5 | 21.8 | 22.3 | 24.5 | 29.8 | 55.9 |
| Example 36 | 0.3 | 22.5 | 21.5 | 20.8 | 21.3 | 23.0 | 25.5 | 48.5 |

Unit of ESR: mΩ

Figure 4:
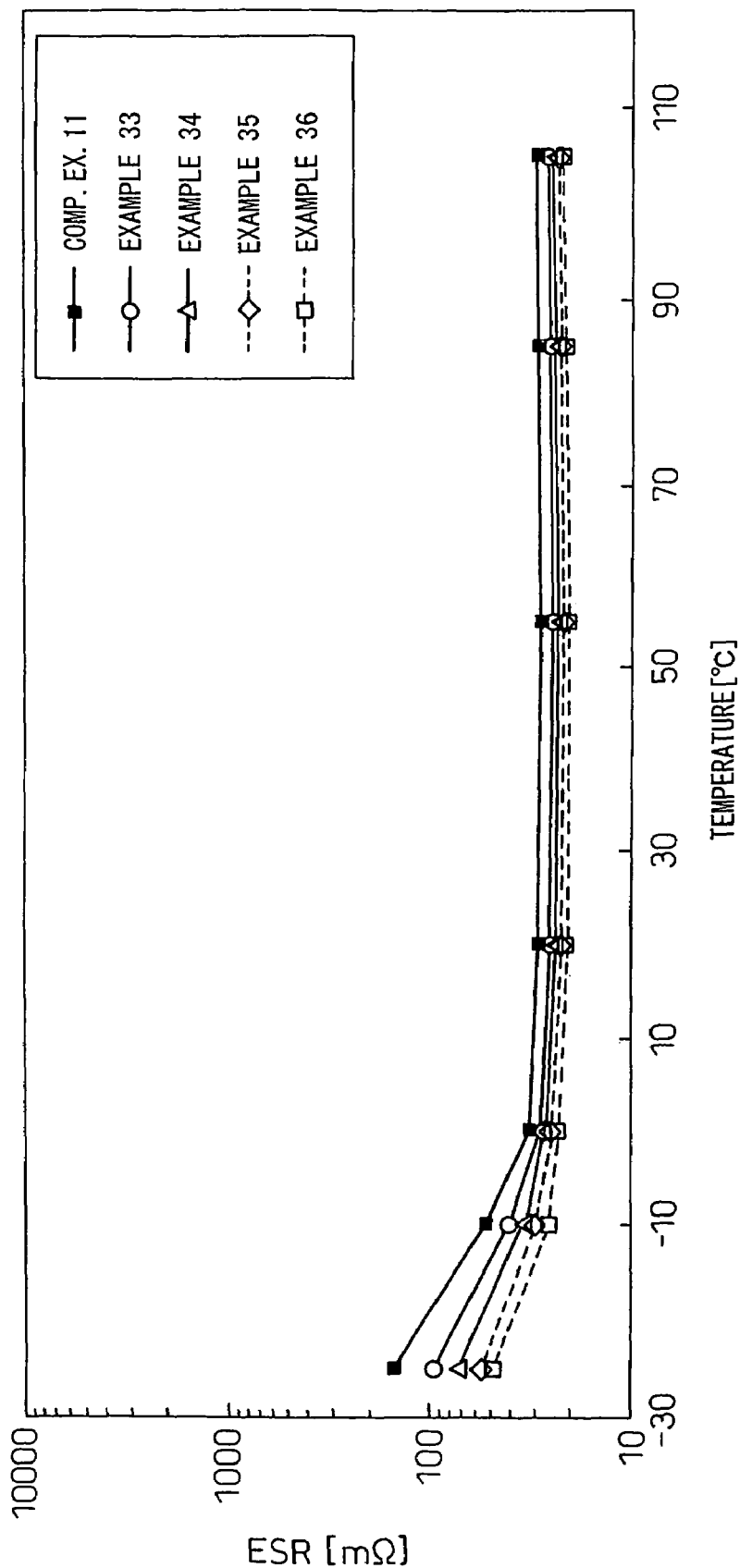
FIG. 4 is a graph showing a relation between the temperature and ESR with respect to the aluminum electrolytic capacitors produced in the examples and comparative examples.

As is apparent from the results in FIG. 4, the electrolytic capacitor of Comparative Example 11, in which the separator has a density of 0.6 g/cm³, shows large change in ESR at 0° C. or lower. On the other hand, the electrolytic capacitors of Examples 33 to 36 in which the separator has a density of 0.5 g/cm³ or less show small change even at a low temperature of 0° C. or lower and are excellent in the stability at low

TABLE 5

| | | | 10 MV-1000 µF | | | | | | | |
|---|---|---|---|---|---|---|---|---|---|---|
| | | | Initial value | | | | After 1000 hours at 105° C. | | | |
| Examples | Electrolytic solution (Example No.) | Separator | Capacitance [µF] | Tan δ [%] | Leakage current [µA] | E.S.R. 100 KHz [mΩ] | Capacitance [µF] | Tan δ [%] | Leakage current [µA] | E.S.R. 100 KHz [mΩ] |
| Comparative Example 10 | Example 28 | Conventional separator | 1035 | 3.4 | 6.1 | 16 | 882 | 5.6 | 2.0 | 30 |
| Example 32 | Example 28 | Polyacrylamide Binder-containing separator | 1038 | 3.4 | 5.9 | 16 | 884 | 4.0 | 2.1 | 16 |

As is apparent from the measurement results in Table 5, the working life can be further improved by changing the kind of the separator to be used even when the same electrolytic solution of the present invention is used.

Comparative Example 11 and Examples 33 to 36

The same procedure as in Example 1 was repeated to obtain aluminum electrolytic capacitors, except that the electrolytic solution of Example 24 was used in common and, as described in Table 6 below, a separator having a density of 0.6 g/cm³ was used in Comparative Example 11, a separator having a density of 0.5 g/cm³ was used in Example 33, a separator having a density of 0.4 g/cm³ was used in Example 34, a separator having a density of 0.35 g/cm³ was used in Example 35 and a separator having a density of 0.3 g/cm³ was used in Example 36 so as to confirm the influence of the density (g/cm³) of the separator to be used on ESR of the capacitor in case of this example. The material of the separator used in this example is a natural fiber.

With respect to the aluminum electrolytic capacitors obtained in the respective examples, ESR (mΩ, 100 kHz) was measured at different temperatures (−25° C., −10° C., 0° C., 20° C., 55° C., 85° C. and 105° C.). As a result, ESR described in Table 6 below was obtained. FIG. 4 is a graph showing a relation between the temperature and ESR with the respective aluminum electrolytic capacitors.

temperature. When a separator having a density of 0.4 g/cm³ or less is used, the resulting electrolytic capacitor shows small change even at low temperature and is excellent in the stability at low temperature. This reason is considered to be as follows. That is, migration of ions between electrode foils is restricted by a large density of the separator, namely, narrow space. When the density is 0.5 g/cm³ or less, a space in which ions are capable of migrating even at low temperature is secured and a change in ESR is suppressed. Therefore, an electrolytic capacitor capable of showing excellent stability at low temperatures ranging from 105 to −25° C. can be obtained by using a separator having a density of 0.5 g/cm³ less in combination with the electrolytic solution of the present invention.

INDUSTRIAL APPLICABILITY

As described in detail above, when the electrolytic solution of the present invention is used, the specific resistance of the electrolytic solution can be decreased. Therefore, equivalent series resistance (ESR) of the capacitor can be remarkably decreased, thus realizing an electrolytic capacitor which is excellent in noise removing ability and efficiency on charging/discharging and also has ideal characteristics for electronic parts.

An aqueous electrolytic solution having low specific resistance is frozen at a low temperature when the content of water increases to about 100%. However, the electrolytic solution of the present invention is stable at a temperature just above the freezing temperature and shows excellent electrical characteristics and also causes less change in ESR. According to the present invention, there can be realized an electrolytic capacitor which shows excellent and stable electrical characteristics in a wide temperature range from low temperature just before a freezing temperature to high temperature and also causes less change in ESR.

Further, according to the present invention, as the total content of an electrolyte as a solute can be controlled to thereby suppress a vigorous reaction with an electrode foil, there can be realized an electrolytic capacitor which is stable at high temperature and has long working life.

Furthermore, an aqueous electrolytic solution with high vapor pressure causes such a problem that case swelling occurs under high temperature conditions at 105° C. and a safety vent operates to cause leakage of the electrolytic solution. However, when the electrolytic solution of the present invention is used, as the case containing a capacitor element is provided with high strength, there can be realized an electrolytic capacitor which causes neither swelling nor liquid leakage.

Furthermore, when the electrolytic solution of the present invention is used, there can be realized an electrolytic capacitor which is excellent in gas barrier properties (airtightness) and sealing strength and is also excellent in work life equivalent to that of an electrolytic capacitor using a conventional electrolytic solution having a high organic solvent content.

Furthermore, as the content of water can be remarkably increased in the electrolytic solution of the present invention, there can be realized a flame-retardant, safe and cheap electrolytic capacitor which has no danger of catching fire when the electrolytic solution leaks out from the electrolytic capacitor due to the operation of a valve.

That is, the electrolytic solution of the present invention can be widely used in an electrolytic capacitor. The electrolytic capacitor of the present invention can be widely used as an electric component in various electric and electronic products. The electrolytic capacitor of the present invention can be widely used for a power circuit and a noise filter for a digital circuit. The electrolytic capacitor of the present invention can be advantageously used in a wide temperature range from a low temperature, just above a freezing temperature of the electrolytic solution, to a high temperature.

The invention claimed is:

1. An electrolytic capacitor comprising a capacitor element, a case containing the capacitor element, and a sealant with which the case is sealed, the capacitor element comprising a pair of electrode foils each comprising a dielectric, a separator for isolating the electrode foils from each other, and an electrolytic solution filled between the electrode foils, wherein the electrolytic solution comprising a solvent and a solute, wherein water accounts for from more than 80% to 100% by weight of the solvent, the solute is selected from a carboxylic acid or a salt thereof and an inorganic acid or a salt thereof, and further comprises one or more compounds selected from a nitro compound, a nitroso compound or a salt thereof, a chelete forming compound or a salt thereof, saccharides, a phosphoric acid compound or a derivative thereof, a watersoluble polymer and a silane coupling agent alone or in combination, and 'the total solute content is from 1.5 to 44% by weight, and in which the content of the carboxylic acid-based electrolytes is within a range from 0.5 to 35% by weight, and wherein the electrolytic solution has a specific resistance at 30° C. of 65 Ωcm or less, and wherein the separator of the capacitor has a space in which ions are capable of migrating between the electrode foils even under low temperature conditions, and has a density of 0.3 to 0.5 g/cm$^3$.

2. The electrolytic capacitor according to claim 1, wherein the separator comprises fibers fixed with a binder soluble in the electrolytic solution.

3. The electrolytic capacitor according to claim 1, wherein the case is made of a non-heat-treated aluminum having purity of 99.0% or higher.

4. The electrolytic capacitor according to claim 1, wherein the case is made of an aluminum alloy containing manganese and/or magnesium.

5. The electrolytic capacitor according to claim 1, wherein the sealant comprises a resin-vulcanized isoprene-isobutylene rubber or a peroxide-vulcanized isobutylene-isoprene rubber.

6. The electrolytic capacitor according to claim 1, further comprising external terminals of a copper or silver wire.

7. The electrolytic capacitor according to claim 1, which is used at a temperature of −40° C. or higher.

8. The electrolytic capacitor according to claim 1, which is used at a temperature of −25° C. or higher.

9. The electrolytic capacitor according to claim 1, wherein the content of water is from more than 90% by weight to 100% by weight based on the solvent.

10. The electrolytic capacitor according to claim 1, wherein the solvent comprises water and at least one organic solvent and the organic solvent is selected
from the group of protonic organic solvents consisting of monohydric alcohols including methyl alcohol, ethyl alcohol, propyl alcohol and butyl alcohol, dihydric
alcohols including ethylene glycol, diethylene glycol and triethylene glycol, and trihydric alcohols including glycerin, and the group of aprotic solvents consisting of γ-butyrolactone, propylene carbonate and sulfolane.

11. The electrolytic capacitor according to claim 1, wherein the total solute content is from 23.5 to 44% by weight.

12. The electrolytic capacitor according to claim 1, wherein the total solute content is from 1.5 to 5% by weight.

13. The electrolytic capacitor according to claim 1, wherein the carboxylic acid or salt thereof is selected from the group consisting of formic acid, acetic acid, propionic acid, butyric acid, salicylic acid, borodisalicylic acid, nitrobenzoic acid, dinitrobenzoic acid, hydroxybenzoic acid, oxalic acid, malonic acid, succinic acid, glutaric acid, adipic acid, fumaric acid, maleic acid, phthalic acid, azelaic acid, sebacic acid, citric acid and hydroxybutyric acid, and ammonium, sodium, potassium, amine and alkylanimonium salts thereof, and is contained in the amount of 0.5 to 44% by weight based on the total amount of the electrolytic solution.

14. The electrolytic capacitor according to claim 1, wherein the inorganic acid or salt thereof is selected from the group consisting of carbonic acid, hypophosphorous acid, phosphorous acid, phosphoric acid, boric acid and sulfamic acid, and ammonium, sodium, potassium, amine and alkylarnmonium salts thereof, and is contained in the amount of 1 to 20% by weight based on the total amount of the electrolytic solution.

15. The electrolytic capacitor according to claim 1, wherein the water-soluble polymer is a synthetic or natural polymer having a molecular weight of 100 to 2,000,000.

16. The electrolytic capacitor according to claim 15, wherein the synthetic polymer is selected from the group consisting of polyacrylic acid, polymethacrylic acid, polyacrylamidepolyvinyl alcohol and polyethylene oxide, and a salt, an ester or a derivative thereof, and the natural polymer is polyalginic acid or poly γ-glutamic acid.

17. The electrolytic capacitor according to claim 1, wherein the nitro compound is selected from the group consisting of nitrophenol, dinitrophenol, nitrobenzoic acid, dinitrobenzoic acid, trinitrobenzoic acid, nitroanisole, nitroacetophenone, aminonitrobenzoic acid, nitrosalicylic acid and nitroguanidine, and a salt or derivative thereof, and the nitroso compound is selected from the group consisting of nitrosobenzoic acid, nitrosonaphthol, nitrosophenol and copperon, and a salt or derivative thereof.

18. The electrolytic capacitor according to claim 17, wherein the nitro compound and/or the nitroso compound is/are contained in the amount of 0.05 to 10% by weight based on the total amount of the electrolytic solution.

19. The electrolytic capacitor according to claim 1, wherein the chelete forming compound is selected from the group consisting of ethylenediaminetetraacetic acid, trans-1,2-diaminocyclohexane-N,N,N',N'-tetraacetic acid monohydrate, dihydroxyethylglycine, ethylenediaminetetrakis(methylenesulfonic acid), diethylenetriamine-N,N,N',N' '-N" pentaacetic acid, citric acid, diaminopropanoltetraacetic acid, ethylenediaminediacetic acid, ethylenediamine-N, N'-bis (methylenesulfonic acid)½ hydrate, glycol ether diaminetetraacetic acid and hydroxyethylethylenediaminetriacetic acid.

20. The electrolytic capacitor according to claim 19, wherein the chelete forming compound is contained in the amount of 0.01 to 5% by weight based on the total amount of the electrolytic solution.

21. The electrolytic capacitor according to claim 1, wherein the saccharides are selected from the group consisting of monosaccharides, disaccharides, trisaccharides, polysaccharides, and a derivative thereof.

22. The electrolytic capacitor according to claim 21, wherein the saccharides are contained in the amount of 0.01 to 10% by weight based on the total amount of the electrolytic solution.

* * * * *